United States Patent
Loboda

(10) Patent No.: US 10,622,199 B2
(45) Date of Patent: Apr. 14, 2020

(54) LASER ABLATION SYSTEM

(71) Applicant: Fluidigm Canada Inc., Markham (CA)

(72) Inventor: Alexander V. Loboda, Thornhill (CA)

(73) Assignee: FLUIDIGM CANADA INC., Markham (CA)

(*) Notice: Subject to any disclaimer, the term of this patent is extended or adjusted under 35 U.S.C. 154(b) by 0 days.

(21) Appl. No.: 16/322,418

(22) PCT Filed: Aug. 2, 2017

(86) PCT No.: PCT/US2017/045060
§ 371 (c)(1),
(2) Date: Jan. 31, 2019

(87) PCT Pub. No.: WO2018/026898
PCT Pub. Date: Feb. 8, 2018

(65) Prior Publication Data
US 2019/0180996 A1    Jun. 13, 2019

Related U.S. Application Data

(60) Provisional application No. 62/370,180, filed on Aug. 2, 2016.

(51) Int. Cl.
*H01J 49/04* (2006.01)
*H01J 49/00* (2006.01)
(Continued)

(52) U.S. Cl.
CPC ...... *H01J 49/0463* (2013.01); *H01J 49/0004* (2013.01); *H01J 49/105* (2013.01); *G01N 2001/045* (2013.01)

(58) Field of Classification Search
USPC ...................................................... 250/288
See application file for complete search history.

(56) References Cited

U.S. PATENT DOCUMENTS

| 6,683,277 B1 | 1/2004 | Millard et al. |
| 7,479,630 B2 | 1/2009 | Bandura et al. |

(Continued)

FOREIGN PATENT DOCUMENTS

| DE | 42 00 497 A1 | 7/1993 |
| WO | 2014/079802 A2 | 5/2014 |

(Continued)

OTHER PUBLICATIONS

Binet, M. et al., "Detection and characterization of zinc- and cadmium-binding proteins in *Escherichia coli* by gel electrophoresis and laser ablation-inductively coupled plasma-mass spectrometry." Analytical Biochemistry, vol. 318, Issue 1. Published Jul. 2003. pp. 30-38.

(Continued)

*Primary Examiner* — Kiet T Nguyen
(74) *Attorney, Agent, or Firm* — Kilpatrick Townsend & Stockton LLP

(57) ABSTRACT

The invention relates to methods and devices for analysis of samples using laser ablation imaging mass cytometry and mass spectrometry. The invention provides methods and devices in which individual ablation plumes are distinctively captured and rapidly transferred to the ionization system, followed by analysis by mass spectrometry. A transfer conduit can be used to convey ablation plumes to an ionization system. The transfer conduit can include an asymmetric cone. The transfer conduit can be tapered. A flow sacrificing system can be adapted to divert a part of the sheath flow out a sacrificial outlet while the core of the sheath flow containing ablation plumes enters the ionization system.

22 Claims, 16 Drawing Sheets

(51) Int. Cl.
*H01J 49/10* (2006.01)
*G01N 1/04* (2006.01)

(56) References Cited

U.S. PATENT DOCUMENTS

| | | |
|---|---|---|
| 2012/0061561 A1 | 3/2012 | Antonov et al. |
| 2014/0268134 A1 | 9/2014 | O'Connor |
| 2016/0056031 A1* | 2/2016 | Loboda ............... H01J 49/0463 250/282 |
| 2016/0260598 A1* | 9/2016 | Loboda ................. G01N 15/10 |

FOREIGN PATENT DOCUMENTS

| | | |
|---|---|---|
| WO | 2014/127034 A1 | 8/2014 |
| WO | 2014/146724 A1 | 9/2014 |
| WO | 2014/147260 A1 | 9/2014 |

OTHER PUBLICATIONS

Becker, J. et al. "Laser ablation inductively coupled plasma mass spectrometry (LA-ICP-MS) in elemental imaging of biological tissues and in proteomics." *Journal of Analytical Atomic Spectrometry*, vol. 22, Issue 7. Published Jun. 2007. pp. 736-744.

Brückner, K. et al. "DNA Quantification via ICP-MS Using Lanthanide-Labeled Probes and Ligation-Mediated Amplification." *Analytical Chemistry*, vol. 86. Published Jan. 7, 2014. pp. 585-591.

Gao, Z. et al. "Direct Labeling micoRNA with an electrocayalytic moiety and its application in ultrasensitive microRNA assays." *Biosensor Bioelectronics*, vol. 22, Issue 6. Published Jan. 15, 2007. pp. 933-940.

Giesen, C. et al. "Multiplexed immunohistochemical detection of tumor markers in breast cancer tissue using laser ablation inductively coupled plasma mass spectrometry." *Analytical Chemistry*, vol. 83. Published Nov. 2011. pp. 8177-8183.

Hutchinson, R. et al. "Imaging and spatial distribution ofβ-amyloid peptide and metal ions in Alzheimer's plaques by laser ablation-inductively coupled plasma-mass spectrometry." Analytical Biochemistry, vol. 346, Issue 2. Published Nov. 2005. pp. 225-233.

International Search Report and Written Opinion received in International Patent Application No. PCT/US2017/045060, dated Dec. 11, 2017. 20 pages.

Kindness, A. et al. "Two-Dimensional Mapping of Copper and Zinc in Liver Sections by Laser Ablation-Inductively Coupled Plasma Mass Spectrometry." Clinical Chemistry, vol. 49, No. 11. Published Oct. 2003. pp. 1916-1923.

Quinn, Z. et al. "Simultaneous determination of proteins using an element-tagged immunoassay coupled with ICP-MS detection." Journal of Analytical Atomic Spectrometry, vol. 17, Issue 8. Published Jul. 2002. pp. 892-896.

Robichaud, G. et al. "MSiReader: an open-source interface to view and analyze high resolving power MS imaging files on Matlab platform." Journal of the American Society for Mass Spectrometry, vol. 24, No. 5. Published Mar. 2013. pp. 718-721.

International Preliminary Report on Patentability received in International Patent Application No. PCT/US2017/045060, dated Feb. 14, 2019. 11 pages.

\* cited by examiner

LASER ABLATION SYSTEM

TECHNICAL FIELD

This invention relates to apparatus and methods for laser ablation for cellular analysis.

BACKGROUND OF THE INVENTION

Laser ablation combined with mass spectrometry can be used for imaging of biological samples, such as cells, tissues, etc. (imaging mass spectrometry; IMS). The samples can be labeled with elemental tags/labelling atoms, thereby enabling imaging mass cytometry (IMC). Each laser pulse generates a plume of ablated material from the sample which can be transferred from where ablation occurs to an ionization system and mass analyzer. The information acquired from the laser pulses at each location on the sample can then be used for imaging the sample based on its analyzed content. However, this technique has limitations in its ability to separately resolve each discrete plume of ablated material produced from each laser ablation pulse on the sample.

BRIEF SUMMARY OF THE INVENTION

In the present invention, the inventor has devised numerous developments of existing laser ablation-based imaging mass cytometers and imaging mass spectrometers. In particular, these developments relate to modifications that minimize the transfer time that it takes plumes of sample material ablated from a sample to be transferred to the components of the imaging mass spectrometer or mass cytometer that ionize and analyze the sample material.

The apparatus of the invention, such as an imaging mass spectrometer or an imaging mass cytometer, typically comprises three components. The first is a laser ablation system for the generation of plumes of vaporous and particulate material from the sample for analysis. Before the atoms in the plumes of ablated sample material (including any detectable labelling atoms as discussed below) can be detected by a mass spectrometer component (MS component; the third component), the sample must be atomized and ionized (some ionization of the sample material may occur upon ablation, but space charge effects result in the neutralization of the charges well before they can be detected, thus the apparatus requires a separate ionization component). Accordingly, the apparatus comprises a second component which is an ionization system that ionizes the atoms to form elemental ions to enable their detection by the MS component based on mass/charge ratio. Between the laser ablation system and the ionization system is a transfer conduit, adapted to couple the laser ablation system with the ionization system; the transfer conduit having an inlet positioned within the laser ablation system, the inlet being configured for capturing the ablated plume as the ablated plume is generated; and for transferring the captured ablated plume to the ionization system (in some instances, such as where the ionization system is an inductively coupled plasma (ICP) the transfer conduit is the same conduit which introduces the sample directly into the ICP torch through the central injector tube, and in this instance the transfer conduit can be termed an injector). Thus in operation, the sample is taken into the apparatus, is ablated to generate vaporous/particulate material, which is ionized by the ionization system, and the ions of the sample are passed into the MS component. Although the MS component can detect many ions, most of these will be ions of the atoms that naturally make up the sample. In some applications, for example analysis of minerals, such as in geological or archaeological applications, this may be sufficient.

In some cases, for example when analyzing biological samples, the native elemental composition of the sample may not be suitably informative. This is because, typically, all proteins and nucleic acids are comprised of the same main constituent atoms, and so while it is possible to tell regions which contain protein/nucleic acid from those that do not contain such proteinaceous or nucleic acid material, it is not universally possible to differentiate a particular protein from all other proteins. However, by labelling the sample with atoms not present in the material being analyzed under normal conditions, or at least not present in significant amounts, (for example certain transition metal atoms, such as rare earth metals; see section on labelling below for further detail), specific characteristics of the particle sample can be determined. In common with IHC and FISH, the detectable labels can be attached to specific targets on or in the sample (such as fixed cells or a tissue sample on a slide), inter alia through the use of affinity reagents such as antibodies or nucleic acids targeting molecules on or in the sample. In order to detect the ionized label, the MS component is used, as it would be to detect ions from atoms naturally present in the sample. By linking the detected signals to the known positions of the laser ablations which gave rise to those signals it is possible to build-up an image of the atoms present at each position, both the native elemental composition and any labelling atoms (see e.g. Hutchinson et al. (2005) Anal. Biochem. 346:225-33, Seuma et al. (2008) Proteomics 8:3775-84, Giesen et al. (2011) Anal. Chem. 83:8177-83 and Giesen et al. (2014) Nature Methods. 11:417-422). The technique allows the analysis of many labels in parallel, which is a great advantage in the analysis of biological samples.

A limitation on the process of laser ablation-based imaging is how quickly the plume of ablated material can be transferred from the laser ablation system to the ionization system and detector. This is because when the plume of ablated material is generated by ablation, that plume of material continues to expand in the gaseous phase over time simply due to diffusion. Thus a longer duration from the timepoint of ablation to the timepoint at which the material is ionized means the transience of each ablation plume in the ionization system and ultimately the detector is longer, as more diffusion of the plume will have occurred. This lengthened detection time has one of two consequences: either (i) the rate at which the plumes are generated (i.e. rate of laser firing in the laser ablation system) must be lowered to maintain the discrete analysis of the plumes or (ii) it must be accepted that the plumes generated from discrete ablating laser pulses will begin to overlap (which can lower the quality of the image if the overlap becomes large, as it will no longer be possible to precisely allot the ions detected by the mass spectrometer to a particular ablated location on the sample; the acceptable degree of overlap therefore varies with the imaging application).

The inventor has now made advances in IMS and IMC apparatus engineering to improve their use for the analysis of samples.

The inventor's improvements relate to the modification of the transfer conduit that couples the laser ablation system with the ionization system (or the injector where the ionization system is an ICP). The improvements include modifications at the inlet of the transfer conduit (e.g. injector) in the laser ablation system, modifications to the transfer conduit (e.g. injector) itself, and modifications at the outlet of the transfer conduit at the ionization system end.

Accordingly, the invention provides an apparatus comprising:
  (i) a laser ablation system, adapted to generate plumes of sample material from a sample;
  (ii) an ionization system, adapted to receive material removed from the sample by the laser ablation system and to ionize said material to form elemental ions;
  (iii) a mass spectrometer to receive elemental ions from said ionization system and to analyze said elemental ions,
  wherein the laser ablation system and the ionization system are coupled together by a transfer conduit, adapted to carry a flow of gas containing plumes of ablated sample material from the laser ablation system to the ionization system, and wherein the inlet of the transfer conduit within the laser ablation system comprises an asymmetric sample cone, with an aperture at the narrow end of the cone.

The invention also provides an apparatus comprising:
  (i) a laser ablation system, adapted to generate plumes of sample material from a sample;
  (ii) an ionization system, adapted to receive material removed from the sample by the laser ablation system and to ionize said material to form elemental ions;
  (iii) a mass spectrometer to receive elemental ions from said ionization system and to analyze said elemental ions,
  wherein the laser ablation system and the ionization system are coupled together by a transfer conduit, adapted to carry a flow of gas containing plumes of ablated sample material from the laser ablation system to the ionization system, wherein the internal surface of the transfer conduit comprises a taper along at least a portion of its length from the inlet (at the laser ablation system end) to the outlet (at the ionization system end).

The invention also provides an apparatus comprising:
  (i) a laser ablation system, adapted to generate plumes of sample material from a sample;
  (ii) an ionization system, adapted to receive material removed from the sample by the laser ablation system and to ionize said material to form elemental ions;
  (iii) a mass spectrometer to receive elemental ions from said ionization system and to analyze said elemental ions,
wherein the laser ablation system and the ionization system are coupled together by a transfer conduit and a flow sacrificing system,
wherein the transfer conduit is adapted to carry a flow of gas containing plumes of ablated sample material from an inlet in the laser ablation system to an outlet in the flow sacrificing system,
wherein the flow sacrificing system comprises a chamber comprising:
  (a) the outlet of the transfer conduit;
  (b) an ionization system inlet, positioned to receive sample material from the transfer conduit outlet and to introduce the sample material into the ionization system; and
  (c) a sacrificial flow outlet,
wherein the flow sacrificing system is adapted to reduce the flow of gas entering the ionization system through the ionization system inlet compared to the flow of gas entering the flow sacrificing system through the transfer conduit, by directing some of the flow of gas entering the flow sacrificing system out of the sacrificial flow outlet, and wherein the outlet of the transfer conduit in the flow sacrificing system is optionally flared.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION OF VARIOUS EMBODIMENTS

Figure 1:
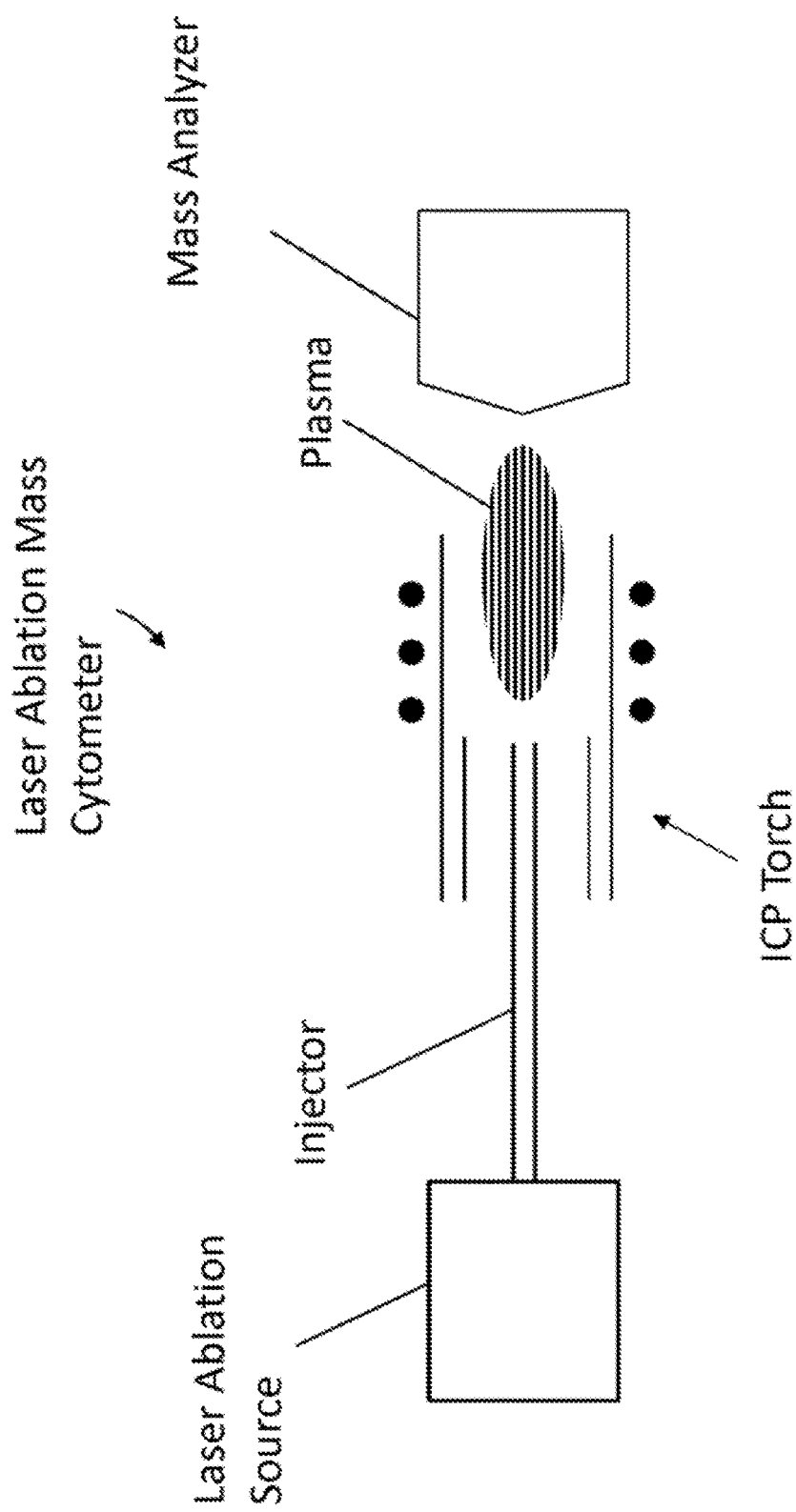
FIG. 1 is a schematic view of a laser ablation mass cytometer.

It should be understood that the phrase "a" or "an" used in conjunction with the present teachings with reference to various elements encompasses "one or more" or "at least one" unless the context clearly indicates otherwise.

The present invention relates to laser ablation combined with inductively coupled plasma mass spectrometry (LA- ICP-MS). LA-ICP-MS has been described for measurement of endogenous elements in biological materials and, more recently, for imaging by detection of elemental-tagged antibodies. See, e.g., Antonov, A. and Bandura, D., 2012, U.S. Pat. Pub. 2012/0061561, incorporated by reference herein; Seuma et al., "Combination of immunohistochemistry and laser ablation ICP mass spectrometry for imaging of cancer biomarkers" 2008, Proteomics 8:3775-3784; Hutchinson et al. "Imaging and spatial distribution of β-amyloid peptide and metal ions in Alzheimer's plaques by laser ablation-inductively coupled plasma-mass spectrometry" Analytical biochemistry 2005, 346.2:225-233; Becker et al. "Laser ablation inductively coupled plasma mass spectrometry (LA-ICP-MS) in elemental imaging of biological tissues and in proteomics." 2007, Journal of Analytical Atomic Spectrometry 22.7:736-744; Binet, et al., "Detection and characterization of zinc- and cadmium-binding proteins in *Escherichia coli* by gel electrophoresis and laser ablation-inductively coupled plasma-mass spectrometry" Analytical Biochemistry 2003, 318:30-38; Quinn, et al., "Simultaneous determination of proteins using an element-tagged immunoassay coupled with ICP-MS detection Journal of Analytical Atomic Spectrometry" 2002, 17:892-96; Sharma, et al., "*Sesbania drummondii* cell cultures: ICP-MS determination of the accumulation of Pb and Cu Microchemical Journal" 2005, 81:163-69; and Giesen et al. "Multiplexed immunohistochemical detection of tumor markers in breast cancer tissue using laser ablation inductively coupled plasma mass spectrometry" 2011, Anal. Chem. 83:8177-8183, each of which is incorporated by reference herein.

The present invention provides methods of laser ablation mass cytometry analysis in which pulses of a laser beam are directed to a sample for generating a plume of sample for each of the pulses; capturing each plume distinctively for each of the pulses; transferring each of the distinctively captured plume to an ionization system; and ionizing each of the distinctively captured and transferred plumes in the ionization system and generating ions for mass analysis and apparatus for carrying out the method. In various embodiments, the apparatus has a laser ablation system for generating an ablated plume from a sample and a transfer conduit adapted to couple the laser ablation system with the ionization system of the apparatus. In some embodiments the transfer conduit can have an inlet positioned within the laser ablation system such that the inlet can be configured for capturing the ablated plume as the ablated plume is generated. A gas inlet can be coupled to the inlet of the transfer conduit for passing a gas there between for transferring the captured ablated plume into the ionization system. Where the ionization system is an ICP, the transfer conduit may be called an injector, if the output of the conduit is directly within the plasma of the ICP. The laser ablation system, ionization system, and mass spectrometer components are discussed in more detail individually below. As noted above, the focus of the present invention is modifications to the transfer conduit which connects the laser ablation system to the ionization system.

Transfer Conduit

The transfer conduit forms a link between the laser ablation system and the ionization system, and allows the transportation of plumes of sample material, generated by the laser ablation system, from the laser ablation system to the ionization system. Part (or all) of the transfer conduit may be formed, for example, by drilling through a suitable material to produce a lumen (e.g., a lumen with a circular, rectangular or other cross-section) for transit of the plume. The transfer conduit sometimes has an inner diameter in the range 0.2 mm to 3 mm. In some embodiments, the internal diameter of the transfer conduit varies along its length. For example, the transfer conduit may be tapered at an end. A transfer conduit sometimes has a length in the range of 1 centimeter to 100 centimeters. In some embodiments the length is no more than 10 centimeters (e.g., 1-10 centimeters), no more than 5 centimeters (e.g., 1-5 centimeters), or no more than 3 cm (e.g., 0.1-3 centimeters). In some embodiments the transfer conduit lumen is straight along the entire distance, or nearly the entire distance, from the ablation system to the ionization system. In some embodiments the transfer conduit lumen is not straight for the entire distance and changes orientation. For example, the transfer conduit may make a gradual 90 degree turn. This configuration allows for the plume generated by ablation of a sample in the laser ablation system to move in a vertical plane initially while the axis at the transfer conduit inlet will be pointing straight up, and move horizontally as it approaches the ionization system (e.g. an ICP torch which is commonly oriented horizontally to take advantage of convectional cooling). In some embodiments the transfer conduit is straight for a distance of least 0.1 centimeters, at least 0.5 centimeters or at least 1 centimeter from the inlet aperture though which the plume enters or is formed. In some embodiments, the transfer conduit is adapted to minimize the time it takes to transfer material from the laser ablation system to the ionization system.

Sample Cone Inlets

Figure 7A:
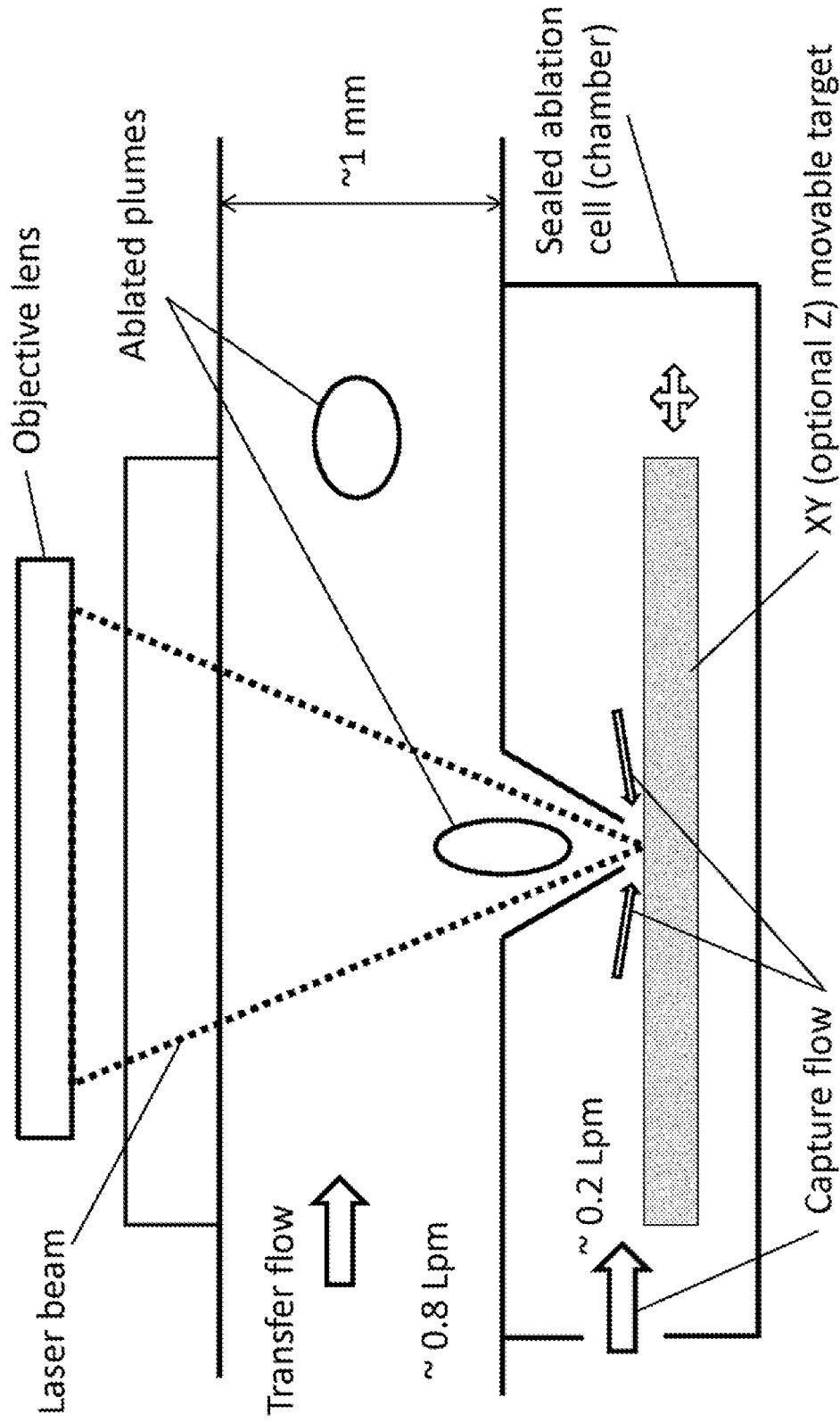
FIG. 7A shows a configuration where the sample under study is illuminated by the laser radiation from the top side.

The transfer conduit comprises an inlet in the laser ablation system, which receives sample material ablated from a sample in the laser ablation system, and transfers it to the ionization system. In some instances, the laser ablation system inlet is the source of all gas flow along the transfer conduit to the ionization system (see for example FIG. 3 and FIG. 10). In some instances, the laser ablation system inlet that receives material from the laser ablation system is an aperture in the wall of a conduit along which a second "transfer" gas is flowed (as disclosed, for example in WO2014146724 and WO2014147260) from a separate transfer flow inlet. In this instance, the transfer gas forms a significant proportion, and in many instances the majority of the gas flow to the ionization system. FIG. 7A shows an embodiment of this design. Here, the laser beam is focused through an objective lens onto a movable target through the ablation system inlet of the transfer conduit, to generate plumes of sample material for analysis. The ablation chamber of the laser ablation system contains a gas inlet (left hand side of chamber). Flowing gas into the chamber through this inlet creates a flow of gas out of the chamber at the cone through which the laser radiation passes to ablate a sample on the movable stage. This flow of gas captures plumes of ablated material, and entrains it as it flows up through the cone (in this embodiment, the cone is the laser ablation system inlet of the transfer conduit) and out of the ablation chamber into the conduit passing above the chamber. This conduit also has gas flowing into it from the separate transfer flow inlet (left hand side of the figure, indicated by the transfer flow arrow). The component comprising the transfer flow inlet, laser ablation system inlet and which begins the transfer conduit which carries the ablated sample material towards the ionization system can also termed a flow cell (as it is in WO2014146724 and WO2014147260).

The transfer flow fulfills at least three tasks: it flushes the plume entering the transfer conduit in the direction of the ionization system, and prevents the plume material from contacting the side walls of the transfer conduit; it forms a "protection region" above the sample surface and ensures that the ablation plume is carried out under a controlled atmosphere; and it increases the flow speed in the transfer conduit. In some embodiments the viscosity of the capture gas is lower than the viscosity of the primary transfer gas. This helps to confine the plume of sample material in the capture gas in the center of the transfer conduit and to minimize the diffusion of the plume of sample material downstream of the laser ablation system (because in the center of the flow, the transport rate is more constant and nearly flat). The gas(es) may be, for example, and without limitation, argon, xenon, helium, nitrogen, or mixtures of these. In some embodiments, the transfer gas is argon. Argon is particularly well-suited for stopping the diffusion of the plume before it reaches the walls of the transfer conduit (and it also assists improved instrumental sensitivity in apparatus where the ionization system is an argon gas-based ICP). The capture gas is preferably helium. However, the capture gas may be replaced by or contain other gases, e.g., hydrogen, nitrogen, or water vapor. At 25° C., argon has a viscosity of 22.6 µPas, whereas helium has a viscosity of 19.8 µPas. In some embodiments the capture gas is helium and the transfer gas is helium.

The use of a sample cone as in FIG. 7A minimizes the distance between the target and the conduit comprising the transfer flow of gas. Because of the reduced distance through which the capture gas flows at the point of the cone, this also leads to improved capture of sample material with less turbulence, and so reduced spreading of the plumes of ablated sample material. The inlet of the transfer conduit is therefore the aperture at the tip of the sample cone. The cone projects into the ablation chamber.

Figure 7B:
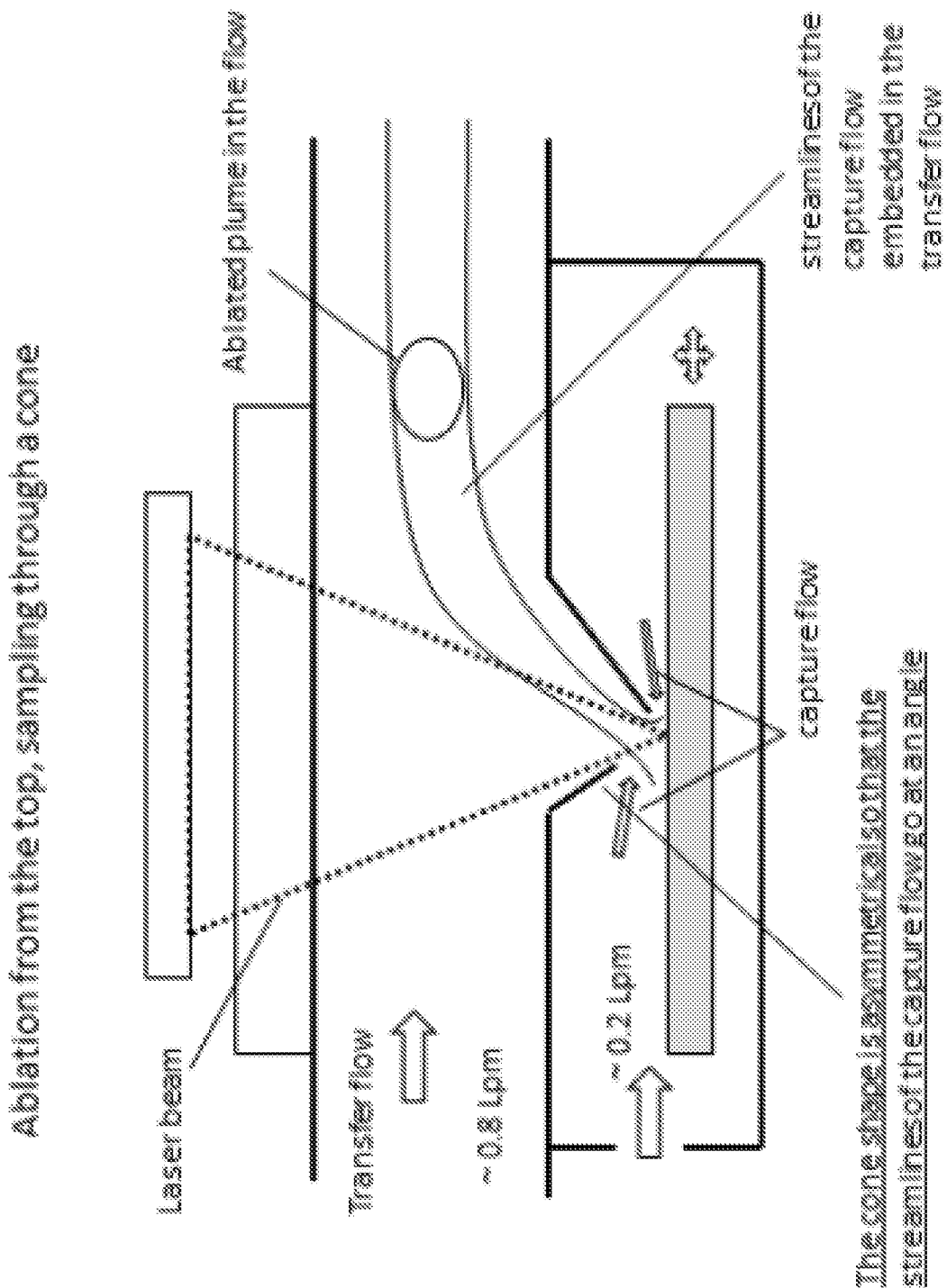
FIG. 7B is a view of an embodiment of this configuration in which the sample cone is asymmetric.

A modification of the sample cone is shown in FIG. 7B. Here, the sample cone is asymmetrical. When the cone is symmetrical, the gas flow from all directions is symmetrical, such that the overall flow of gas is zero (is neutralized) along the surface of the sample at the axis of the sample cone. By making the cone asymmetrical, a non-zero velocity along the sample surface is created, which assists in the washout of plume materials from the ablation chamber of the laser ablation system. FIG. 7B shows an asymmetry of the cone that projects the capture flow of gas entering the transfer conduit from the laser ablation system in the same direction as the transfer flow in the transfer conduit. This figure also illustrates how the asymmetry influences the projected streamlines of gas flow of the capture gas flow within the transport gas flow, together with a captured plume within the capture flow. Accordingly, in some embodiments, the sample cone of the transfer conduit is asymmetric. The asymmetric sample cone is adapted to cause a non-zero vector gas flow on the surface of a sample at the axis of the sample cone.

Thus, the invention provides an apparatus comprising:
(i) a laser ablation system, adapted to generate plumes of sample material from a sample;
(ii) an ionization system, adapted to receive material removed from the sample by the laser ablation system and to ionize said material to form elemental ions;
(iii) a mass spectrometer to receive elemental ions from said ionization system and to analyze said elemental ions, wherein the laser ablation system and the ionization system are coupled together by a transfer conduit, adapted to carry a flow of gas containing plumes of ablated sample material from the laser ablation system to the ionization system, and wherein the inlet of the transfer conduit within the laser ablation system is an asymmetric sample cone, with an aperture at the narrow end of the cone. Sometimes, the inlet within the laser ablation system is asymmetric and projects into the ablation chamber of the laser ablation system in a non-horizontal (e.g. vertical or perpendicular to the surface of the sample) direction (where an asymmetric sample cone is an example of such an inlet). The asymmetric inlet, such as the asymmetric sample cone, is adapted so that a higher capture flow enters the inlet on one side of the inlet.

FIG. 7B shows a cone which is asymmetric because the one side of the cone projects closer to the target than the other side. In three dimensions, this represents a cone in which the tip has been truncated at an angle (i.e. non-parallel) to the base of the cone. Accordingly in some embodiments, the asymmetric sample cone is a truncated cone.

In practice, any modification of the sample cone that causes a non-zero vector gas flow along the surface of the sample at the axis of the cone may be employed. According, in some embodiments, the asymmetric cone comprises a notch or a series of notches, adapted to generate non-zero vector gas flow along the surface of the sample at the axis of the cone. In some embodiments, the asymmetric cone comprises an orifice in the side of the cone, adapted to generate non-zero vector gas flow along the surface of the sample at the axis of the cone. This orifice will imbalance gas flows around the cone, thereby again generating a non-zero vector gas flow along the surface of the sample at the axis of the cone at the target. In some instances, the side of the cone may comprise more than one orifice, such as two, three, four, five, six, seven, eight, nine, ten or more than 10 orifices. In some embodiments, the sample cone may include both one or more notches and one or more orifices. In some embodiments, the edges of the notch(es) and/or orifice(s) are smoothed, rounded or chamfered in order to prevent or minimize turbulence.

Different orientations of the asymmetry of the cone will be appropriate for different situations, dependent on the choice of capture and transfer gas and flow rates thereof, and it is within the abilities of the skilled person to appropriately identify the combinations of gas and flow rate for each orientation. In some embodiments, the asymmetry provides increased capture flow from the same source direction as the transfer flow (in other words, the capture flow direction is in line with the transport flow), as illustrated in FIG. 7B. When the capture flow is more in line with the transport flow, this can help to place the streamlines of the capture flow in the middle of the transfer flow without excessive turbulence. According, in some embodiments, the asymmetric inlet, such as an asymmetric sample cone, is adapted so that the streamlines of the capture flow are directed at an angle (i.e. not at a right angle, perpendicular to the surface of the sample).

A further kind of asymmetry is a cone formed from two elliptical halves, which share a common height (z) and one base diameter (the x diameter), but which differ in the other base (the y diameter) (or one elliptical and one circular half).

All of the above adaptations may be present in a single asymmetric sample cone as use in the invention. For example, the cone may be asymmetrically truncated and formed from two different elliptical cone halves, the cone may be asymmetrically truncated and comprise one of more orifices and so on.

The sample cone is therefore adapted to capture all or part of a plume of material ablated from a sample in the laser ablation system. The sample cone is positioned operably proximate to the sample, e.g. by maneuvering the sample within the laser ablation system on a movable sample carrier tray, as described in more detail below. As noted above, plumes of ablated sample material enter the transfer conduit through an aperture at the narrow end of the sample cone. In some embodiments, the diameter of the aperture a) is adjustable; b) is sized to prevent perturbation to the ablated plume as it passes into the transfer conduit; and/or c) is about the equal to the cross-sectional diameter of the ablated plume. In some embodiments, the diameter of the aperture is between about 100 μm to 1 mm. For example, the diameter of the aperture is between about 200 μm to 900 μm, such as 300 μm to 800 μm. In some embodiments, the diameter of the aperture is between about 500 μm to 700 μm. In some embodiments, the diameter of the aperture is about 500 μm. In some embodiments, the diameter of the aperture is about 700 μm.

Tapered Conduits

In tubes with a smaller internal diameter, the same flow rate of gas moves at a higher speed. Accordingly, by using a tube with a smaller internal diameter, a plume of ablated sample material carried in the gas flow can be transported across a defined distance more rapidly at a given flow rate (e.g. from the laser ablation system to the ionization system in the transfer conduit). One of the key factors in how quickly an individual plume can be analyzed is how much the plume has diffused during the time from its generation by ablation through to the time its component ions are detected as the mass spectrometer component of the apparatus (the transience time at the detector). Accordingly, by using a narrow transfer conduit, the time between ablation and detection is reduced, thereby meaning diffusion is decreased because there is less time in which it can occur, with the ultimate result that the transience time of each ablation plume at the detector is reduced. Lower transience times mean that more plumes can be generated and analyzed per unit time, thus producing images of higher quality and/or faster.

Accordingly, the invention also provides an apparatus comprising:
  (i) a laser ablation system, adapted to generate plumes of sample material from a sample;
  (ii) an ionization system, adapted to receive material removed from the sample by the laser ablation system and to ionize said material to form elemental ions;
  (iii) a mass spectrometer to receive elemental ions from said ionization system and to analyze said elemental ions,
  wherein the laser ablation system and the ionization system are coupled together by a transfer conduit, adapted to carry a flow of gas containing plumes of ablated sample material from the laser ablation system to the ionization system, wherein the internal surface of the transfer conduit comprises a taper along at least a portion of its length from the inlet (at the laser ablation system end) to the outlet (at the ionization system end).

Figure 7C:
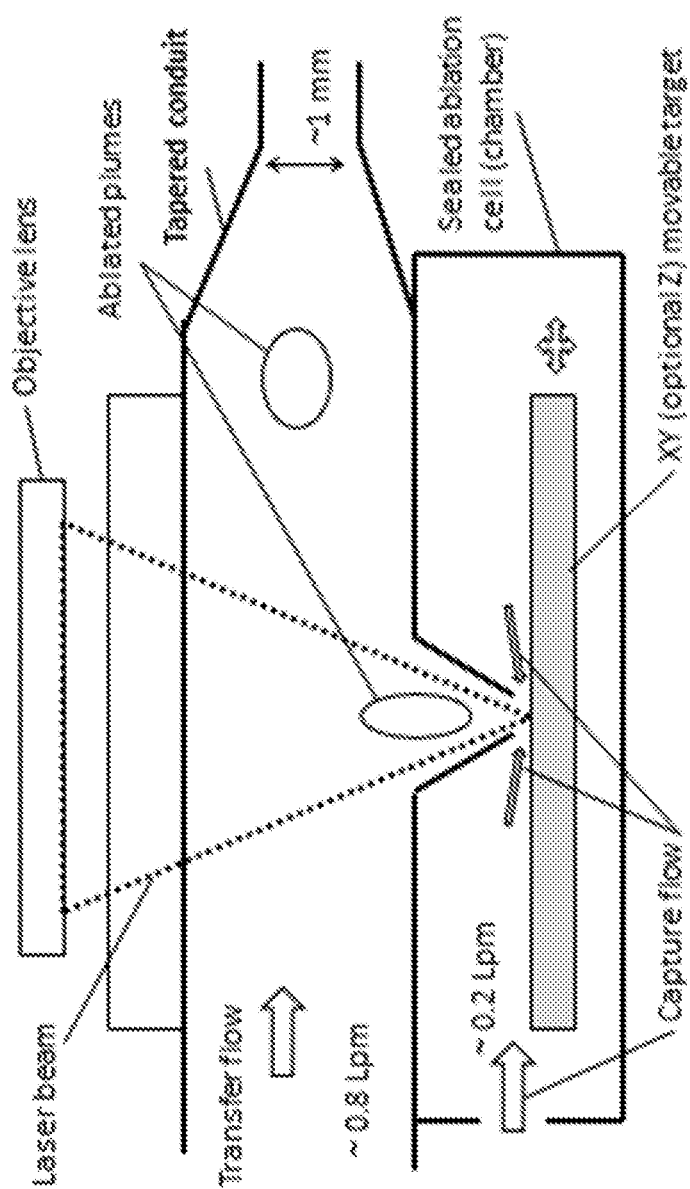
FIG. 7C is a view of the tapered transfer conduit embodiment of this configuration.

The taper may comprise a gradual change in the internal diameter of the transfer conduit along said portion of the length of the transfer conduit (i.e. the internal diameter of the tube were a cross section taken through it decreases along the portion from the end of the portion towards the inlet (at the laser ablation system end) to the outlet (at the ionization system end). As shown in FIGS. 3B and 7C, the tapering modification to the transfer conduit is applicable to all embodiments of the apparatus described herein, whether they comprise a direct injector inlet, a sample cone, or any other structure at the ionization system inlet end of the transfer conduit. With reference to FIG. 3B, the region of the conduit near where ablation occurs has a relatively wide internal diameter. The larger volume of the conduit before the taper facilitates the confinement of the materials generated by ablation. When the ablated particles fly off from the ablated spot they travel at high velocities. The friction in the gas slows these particles down but the plume can still spread on a sub-millimeter to a millimeter scale. Allowing for sufficient distances to the walls helps with the containment of the plume near the center of the flow.

Because the wide internal diameter section is only short (of the order of 1-2 mm), it does not contribute significantly to the overall transience time providing the plume spends more time in the longer portion of the transfer conduit with a narrower internal diameter. Thus, a larger internal diameter portion is used to capture the ablation product and a smaller internal diameter conduit is used to transport these particles rapidly to the ionization system.

FIG. 7C shows the application of this development to apparatus comprising a sample cone at the ionization system inlet to the transfer conduit. As described above, the conduit comprises a wider internal diameter section and a taper down to a narrower internal dimeter conduit, which results in a shorter transfer time of ablated plumes to the ionization system, and ultimately shorter transience times for each plume at the mass spectrometer. The portion of the transfer conduit near the sample cone which receives plumes of material following ablation has a broad internal diameter, and as before is broad enough to contain enough gas to stop the plume material, generated by ablation of the sample, from hitting the sides of the conduit and to entrain the ablated sample material within the transfer flow passing through the flow cell from the transfer flow inlet. This broad portion will in many instances be a unitary component with the sample cone, and so the broadness of the internal diameter (e.g. approximately 2 mm) also facilitates manufacture.

In some embodiments, the taper begins within 50 mm of the ionization system inlet to the transfer conduit. In some embodiments, the taper begins within 40 mm of the ionization system inlet, such as within 30 mm, within 20 mm, within 15 mm, or within 10 mm of the ionization system inlet. In some embodiments, the taper begins within 5 mm, within 4 mm, within 3 mm, within 2 mm or within 1 mm downstream of the ionization system inlet. In some embodiments, the taper begins 1-2 mm downstream of the ionization system inlet.

The taper between the large internal diameter portion and the small internal diameter region can be made sufficiently gentle to avoid the onset of the turbulence. For example, the taper can be at an angle of at least 5 degrees. In some embodiments, the angle of the taper can be at least 10 degrees, such as at least 15 degrees, at least 20 degrees, at least 25 degrees, or 30 degrees or more, even such as 60 degrees. In some embodiments, the taper is at an angle less than 40 degrees, such as less than 30 degrees, less than 25 degrees, less than 20 degrees, less than 15 degrees, or less than 10 degrees. In some embodiments, the taper is at an angle less than 8 degrees, such as less than 5 degrees, less than 4 degrees, less than 3 degrees, less than 2 degrees, or less than 1 degree. In some embodiments, the angle of the taper is between 10 and 30 degrees. In some embodiments, the angle of the taper may increase or decrease along the length of the taper.

In some embodiments, the length of the taper is at least 5 mm, for example at least 10 mm, at least 20 mm, at least 30 mm, at least 40 mm or at least 50 mm or at least 100 mm. In some embodiments, the length of the taper is less than 10 mm, for example, less than 5 mm, less than 4 mm, less than 3 mm, less than 2 mm or 1 mm or less.

The transfer conduit internal diameter can be x millimeters (mm) at the input end of the conduit but it can be tapered down 5-fold to x/5 mm near the output end (e.g. 4 mm at the input end and 800 µm at the output end). In some embodiments, the taper reduces the internal diameter of the transfer conduit by less than 5-fold, such as 4-fold or less, 3-fold or less, or 2-fold or less. The internal diameter is the measure of the longest cross-section through the conduit. E.g. if the conduit is circular, the internal diameter is simply the diameter of the circle, but if the conduit is a rectangle, it is the diagonal. In some embodiments, the internal diameter of the conduit following the taper is narrower than 2 mm, for example narrower than 1.5 mm, narrower than 1.25 mm, narrower than 1 mm, narrower than 900 µm, narrower than 800 µm, narrower than 700 µm, narrower than 600 µm, or 500 µm or narrower. In some embodiments, the internal diameter of the conduit following the taper is 400 µm or narrower, 300 µm or narrower, 200 µm or narrower or 100 µm or narrower.

The diameter of the narrow internal diameter section is limited by the diameter corresponding to the onset of turbulence. A Reynolds number can be calculated for a round tube and a known flow. In general a Reynolds number above 4000 will indicate a turbulent flow, and thus should be avoided. A Reynolds number above 2000 will indicate a transitional flow (between non-turbulent and turbulent flow), and thus may also be desired to be avoided. For a given mass flow of gas the Reynolds number is inversely proportional to the diameter of the conduit. Accordingly, in some embodiments, the internal diameter of the narrow internal diameter section of the transfer conduit is narrower than 2 mm, for example narrower than 1.5 mm, narrower than 1.25 mm, narrower than 1 mm, but greater than the diameter at which a flow of helium at 4 liters per minute in the conduit has a Reynolds number greater than 4000.

Rough or even angular edges in the transitions between the constant diameter portions of the transfer conduit and the taper may cause turbulence in the gas flow. Accordingly, in some embodiments, the transitions into and from the taper should have smooth edges adapted to suppress the onset of turbulence. For instance, the edges may be rounded and or chamfered.

Apparatus comprising a tapered conduit can also comprise a sample cone (optionally asymmetric). As would be understood by the skilled person, the tapered conduit can be employed in any of the apparatus described herein which use alternative transfer conduit arrangements, as illustrated e.g. in FIGS. 2-10, and as discussed herein in detail in the following sections.

Sacrificial Flow

At higher flows, the risk of turbulence occurring in the conduit increases. This is particularly the case where the transfer conduit has a small internal diameter (e.g. 1 mm). The inventor has discovered, however, that it is possible to achieve high speed transfer (up to and in excess of 300 m/s) in transfer conduits with a small internal diameter if a light gas, such as helium or hydrogen, is used instead of argon, which is traditionally used as the transfer flow of gas. In certain embodiments, a mixture of gas primarily comprising helium or hydrogen is used.

High speed transfer presents problems insofar as it may cause the plumes of ablated sample material to be passed through the ionization system without an acceptable level of ionization occurring. The level of ionization can drop because the increased flow of cool gas reduces the temperature of the plasma at the end of the torch. If a plume of sample material is not ionized to a suitable level, information is lost from the ablated sample material—because its components (including any labelling atoms/elemental tags) cannot be detected by the mass spectrometer. For example, the sample may pass so quickly through the plasma at the end of the torch in an ICP ionization system that the plasma ions do not have sufficient time to act on the sample material to ionize it. The inventor has discovered that this problem, caused by high flow, high speed transfer in narrow internal diameter transfer conduits can be solved by the introduction of a flow sacrificing system at the outlet of the transfer conduit. The flow sacrificing system is adapted to receive the flow of gas from the transfer conduit, and pass only a portion of that flow (the central portion of the flow comprising any plumes of ablated sample material) onwards into the injector that leads to the ionization system. To facilitate dispersion of gas from the transfer conduit in the flow sacrificing system, the transfer conduit outlet can be flared out.

The flow sacrificing system is positioned close to the ionization system, so that the length of the tube (e.g. injector) that leads from the flow sacrificing system to the ionization system is short (e.g. ~1 cm long; compared to the length of the transfer conduit which is usually of a length of the order of tens of cm, such as ~50 cm). Thus the lower gas velocity within the tube leading from the flow sacrificing system to the ionization system does not significantly affect the total transfer time, as the relatively slower portion of the overall transport system is much shorter.

Accordingly, the invention provides an apparatus comprising:

(i) a laser ablation system, adapted to generate plumes of sample material from a sample;
(ii) an ionization system that is adapted to receive material removed from the sample by the laser ablation system and to ionize said material to form elemental ions;
(iii) a mass spectrometer to receive elemental ions from said ionization system and to analyze said elemental ions, wherein the laser ablation system and the ionization system are coupled together by a transfer conduit and a flow sacrificing system, wherein the transfer conduit is adapted to carry a flow of gas containing plumes of ablated sample material from an inlet in the laser ablation system to an outlet in the flow sacrificing system, wherein the flow sacrificing system comprises a chamber comprising:

(a) the outlet of the transfer conduit;
(b) an ionization system inlet, positioned to receive sample material from the transfer conduit outlet and to introduce the sample material into the ionization system; and
(c) a sacrificial flow outlet, wherein the flow sacrificing system is adapted to reduce the flow of gas entering the ionization system through the ionization system inlet compared to the flow of gas entering the flow sacrificing system through the transfer conduit, by directing some of the flow of gas entering the flow sacrificing system out of the sacrificial flow outlet, and wherein the outlet of the transfer conduit in the flow sacrificing system is optionally flared.

In some embodiments, the ionization system inlet is positioned co-axially to the outlet of the transfer conduit (because the plumes of sample material being transferred along the conduit will be entrained within the center of the transfer flow), to maximize transmission of material from the transfer conduit, through the flow sacrificing system, to the ionization system inlet, and so to the injector of the ionization system. In some embodiments, the ratio of the internal diameter of the transfer conduit to the internal diameter of the inlet of the ionization system is less than 2:1, for example 1.5:1 or 1:1. In some embodiments, the ratio of the internal diameter of the transfer conduit to the internal diameter of the injector of the ionization system is less than 2:1, for example 1.5:1 or 1:1. In some embodiments, the internal diameter of the injector of the ionization system (or the inlet to the ionization system) has a greater internal diameter than the transfer conduit. For example, in some embodiments, the ratio of the internal diameter of the transfer conduit to the internal diameter of the inlet of the ionization system is less than 1:1, for example 1:1.5 or 1:2. In some embodiments, the ratio of the internal diameter of the transfer conduit to the internal diameter of the injector of the ionization system is less than 1:1, for example 1:1.5 or 1:2.

In most arrangements, it is not desirable, or in some cases possible, to significantly increase the diameter of the tube (e.g. the injector) which passes from the flow sacrificing system to the ionization system as a way of reducing the speed of the gas at a volumetric flow rate. For example, where the ionization system is an ICP, the conduit from the flow sacrificing system forms the injector tube in the center of the ICP torch. When a wider internal diameter injector is used, there is a reduction in signal quality, because the plumes of ablated sample material cannot be injected so precisely into the center of the plasma (which is the hottest and so the most efficiently ionizing part of the plasma). The strong preference is for injectors of 1 mm internal diameter, or even narrower (e.g. an internal diameter of 800 μm or less, such as 600 μm or less, 500 μm or less or 400 μm or less). Other ionization techniques rely on the material to be ionized within a relatively small volume in three dimensional space (because the necessary energy density for ionization can only be achieved in a small volume), and so a conduit with a wider internal diameter means that much of the sample material passing through the conduit is outside of the zone in which energy density is sufficient to ionize the sample material. Thus narrow diameter tubes from the flow sacrificing system into the ionization system are also employed in apparatus with non-ICP ionization systems. As noted above, if a plume of sample material is not ionized to a suitable level, information is lost from the ablated sample material—because its components (including any labelling atoms/elemental tags) cannot be detected by the mass spectrometer.

Rough or even angular edges in the transition between the constant diameter portion of the transfer conduit and the flare at the outlet may cause turbulence in the gas flow. Accordingly, in some embodiments, the transition into the flare out should have smooth edges adapted to suppress the onset of turbulence. For example, the edges may be rounded.

Pumping can be used to help ensure a desired split ratio between the sacrificial flow and the flow passing into the inlet of the ionization system. Accordingly, in some embodiments, the flow sacrificing system comprises a pump attached to the sacrificial flow outlet. A controlled restrictor can be added to the pump to control the sacrificial flow. Therefore, in some embodiments, the pump of the flow sacrificing system further comprises a restrictor adapted to control the flow of gas through the sacrificial flow outlet. In some embodiments, the flow sacrificing system comprises a mass flow controller, adapted to control the restrictor.

Where expensive gases are used, the gas pumped out of the sacrificial flow outlet can be cleaned up and recycled back into the same system using known methods of gas purification. Helium is particularly suited as a transport gas as noted above, but it is expensive; thus, it is advantageous to reduce the loss of helium in the system (i.e. when it is passed into the ionization system and ionized). The flow sacrificing system splits the helium flow into a near-axial flow and a sacrificial flow. The sacrificial flow can be cleaned up and recycled in the system while the near-axial flow (the central portion of the flow that carries the entrained particles from the ablated plume) will be passed into the ionization system (e.g. the plasma of an ICP torch). The helium from the near-axial flow will be lost for recovery. Accordingly, in some embodiments a gas purification system is connected to the sacrificial flow outlet of the flow sacrificing system. In some embodiments, the gas purification system provides a portion of the gas flowed into the apparatus, for example through an inlet into the laser ablation system's ablation chamber and/or through an inlet in the transfer conduit (i.e. it is used as either the capture flow and/or the gas that makes up most of the transfer flow—indicated by the arrows on the left hand side of FIG. 7).

Figure 8A:
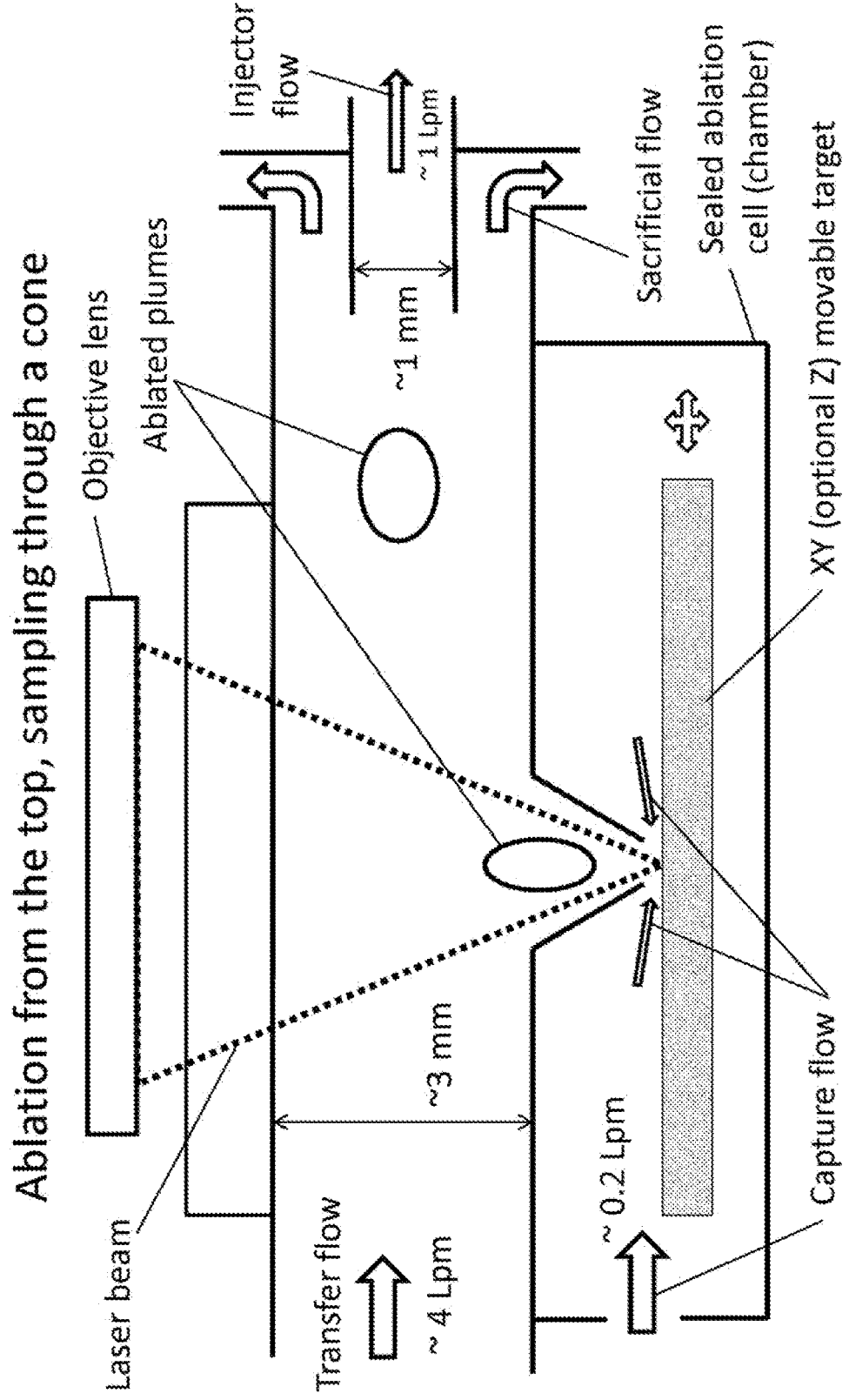
FIG. 8A shows an embodiment in which a part of the sheath flow is discarded as a sacrificial flow while the core of the sheath flow containing capture flow and plume material enters the tube to the ionization system (e.g. injector).
Figure 8B:
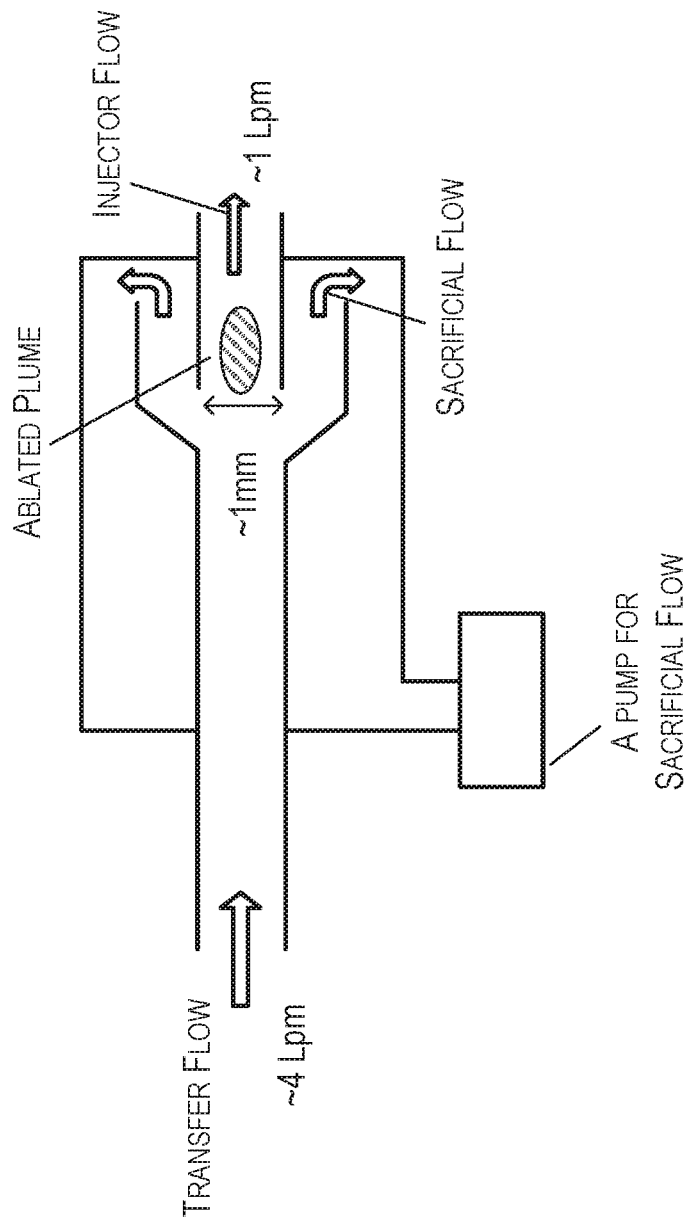
FIG. 8B shows an embodiment where the internal diameter of the transfer conduit and the inlet to the ionization system are similar and the transfer conduit is flared out at its outlet in the flow sacrificing system.
Figure 8C:
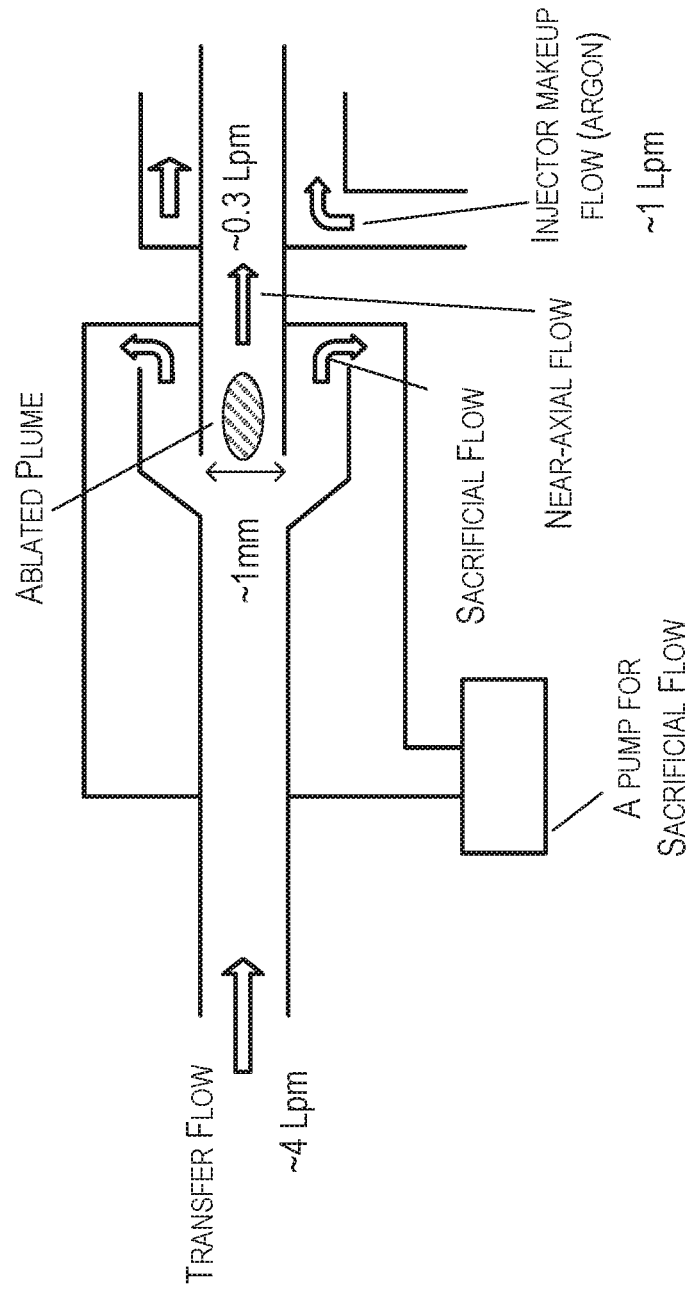
FIG. 8C shows an adaptation of the FIG. 8B embodiment, where the flow sacrificing system is adapted to cause an even greater reduction in the proportion of the flow from the transfer conduit that passes into the inlet to an ICP ionization system. To increase flow rate to the optimum for introduction of sample into an ICP plasma, a makeup flow is introduced (the make-up flow comprises a different composition of gases from the transfer flow exiting the transfer conduit outlet in the flow sacrificing system).

A further refinement of the setup is provided in FIG. 8C, and is a particular optimization of the flow sacrificing system in apparatus in which the ionization system is an ICP. As before, a larger transfer flow rate is sent down the transfer conduit and only the central portion of this flow is allowed to become the part of the injector flow that will enter the plasma of the ICP torch. Typically, helium gas will be used as a transfer flow, because as noted above its properties are well suited for high velocity transport of the plume material over a long conduit (i.e. less chance to trigger the turbulence for the same flow velocity (as compared to argon). Even incorporating a gas purification system that recycles helium from the sacrificial flow, the near-axial flow of helium that continues through the flow sacrificing system into the ionization system is lost.

Figure 8D:
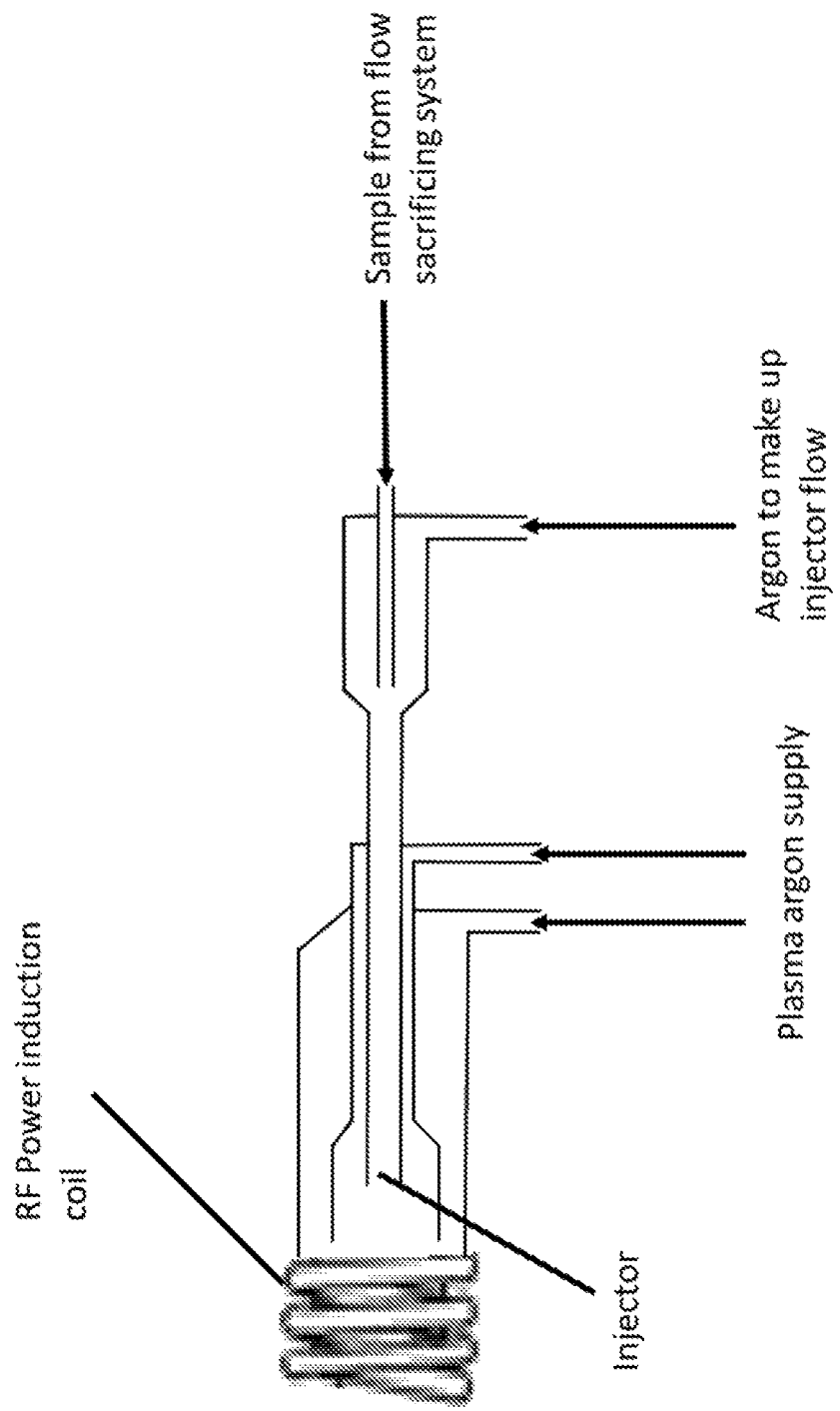
FIG. 8D shows a diagram of an ICP plasma torch including an inlet for make-up flow gas.

However, a further reduction of the near-axial flow in the setup of FIG. 8B that is passed into the ionization system inlet can have a negative consequence on the ionization sampling efficiencies in an inductively coupled plasma. The apparatus in FIG. 8C offers a solution to this problem. Here, another flow of a less valuable gas, such as Argon, is added to make up the flow in the injector of the ICP torch. The injector flow can be tuned to optimize ionization sampling efficiency. Argon gas is commonly used for the formation of a central channel in the inductively coupled plasma, and, accordingly, can be added to the injector flow as shown in FIG. 8C. Thus, the near-axial flow carried from the transfer conduit outlet into the ionization system inlet is chosen to be sufficiently small, but not so small that plume transients are significantly affected. A makeup flow of argon is chosen to provide optimal ionization conditions in the inductively coupled plasma. Accordingly, in some embodiments, the flow sacrificing system is adapted to reduce the flow of gas passing into the ionization system inlet (e.g. the injector of an ICP torch ionization system) to below 1 Lpm, such as 0.5 Lpm or less, 0.4 Lpm or less, 0.3 Lpm or less, or 0.2 Lpm or less. In some embodiments, the ICP injector comprises a second inlet into which gas can be flowed to make up the flow rate in the injector. In some embodiments, the second inlet comprises a concentric tube around the injector attached to the ionization system inlet that introduces the make-up gas as a sheath flow around the sample-containing gas flow from the flow sacrificing system. This make up flow inlet is different from the flow of argon gas also provided in the middle and outer concentric tubes which support the plasma, as illustrated in FIG. 8D. This injector can also be termed a dual concentric injector. Accordingly, in one aspect the invention provides an injector according to FIG. 8D, which comprises a dual concentric portion.

Apparatus comprising a flow sacrificing system can also comprise a sample cone (optionally asymmetric) or a tapered conduit, as described above. In some embodiments, the apparatus comprise a flow sacrificing system, a sample cone (optionally asymmetric) and a tapered conduit, as described above. As would be understood by the skilled person, the flow sacrificing system can be employed in any of the apparatus described herein which use alternative transfer conduit arrangements, as illustrated e.g. in FIGS. 2-10, and as discussed herein in detail in the following sections.

Laser Ablation System

The laser ablation system, also referred to as the "ablation cell," houses the sample during ablation. Typically the ablation cell includes a laser transparent window to allow laser energy to strike the sample. Optionally the ablation cell includes a stage to hold the sample to be analyzed. In some embodiments the stage is movable in the x-y or x-y-z dimensions. In drawings and examples herein, the laser ablation system is sometimes shown as an open arrangement. However, such configurations are for illustration only, and it will be recognized that some form of suitable enclosure for preventing contamination or infiltration from the ambient environment is present. For example, a chamber configured with gas inlets and/or optical ports can be arranged around the laser ablation system to provide an enclosed environment suitable for capturing and transferring the ablated plume for mass analysis (e.g. FIG. 7). The gas inlets and optical port(s) are positioned so that the orientation of the laser beam, sample, plume expansion, and transfer conduit are suitable for the methods and devices disclosed herein. It will be appreciated that the ablation cell is generally gas tight (except for designed exits and ports).

Lasers used for laser ablation according to the invention generally fall into three categories: femtosecond pulsed lasers, deep UV pulsed lasers and pulsed lasers with a wavelength chosen for high absorption in the ablated material ("wavelength selective lasers"). Deep UV and wavelength specific lasers would likely operate with nanosecond or picosecond pulses. Each class of lasers has its drawbacks and benefits and can be chosen based on a particular application. In some embodiments, the laser is a femtosecond pulsed laser configured to operate with a pulse rate between 10 and 10000 Hz. Femtosecond laser are known (see, e.g., Jhanis et al., "Rapid bulk analysis using femtosecond laser ablation inductively coupled plasma time-of-flight mass spectrometry" J. Anal. At. Spectrom., 2012, 27:1405-1412.

Femtosecond lasers allow for laser ablation of virtually all materials with the only prerequisite for laser ablation being sufficient power density. This can be achieved even with relatively low pulse energy when the beam is tightly focused, for instance to 1 micrometer diameter and is short in duration (focused in time). Deep UV lasers also can ablate a large class of materials because most of the commonly used materials absorb deep UV photons. Wavelength selective laser ablation can utilize the lasers with the specific laser wavelength targeting absorption in the substrate material. A benefit of the wavelength specific laser may be the cost and simplicity of the laser and the optical system, albeit with a more limited spectrum of substrate materials. Suitable lasers can have different operating principles such as, for example, solid state (for instance a Nd:YAG laser), excimer lasers, fiber lasers, and OPO lasers.

A useful property of the femtosecond laser radiation is that it is absorbed only where the threshold power density is reached. Thus, a converging femtosecond laser radiation can pass through a thicker section of material without being absorbed or causing any damage and yet ablate the same material right at the surface where the focus is occurring. The focus can then be moved inside the material progressively as the sample layers are ablated. Nanosecond laser pulses might be partially absorbed by the substrate but can still work for ablation since the energy density at the focal point will be the highest (as long as it is sufficient for ablation).

The spatial resolution of signals generated in this way depends on two main factors: (i) the spot size of the laser, as signal is integrated over the total area which is ablated; and (ii) the speed at which a plume can be analyzed, relative to the speed at which plumes are being generated, to avoid overlap of signal from consecutive plumes, as discussed above. The distance referred to as spot size corresponds to the longest internal dimension of the beam, e.g. for a circular beam it is a beam of diameter 2 µm, and for a square beam corresponds to the length of the diagonal between opposed corners). The laser pulse may be shaped using an aperture, homogenized (if required) using a beam homogenizer, focused, e.g., using an objective lens, to produce a desired spot size. Typically, the spot size is 100 µm or less, such as 50 µm or less, 25 µm or less, 20 µm or less, 15 µm or less, or 10 µm or less than 10 µm. Exemplary spot sizes include diameters (or equivalent sized ablation areas of other shapes) in the range of 0.10-3 µm (e.g., about 0.3 µm), 1-5 µm (e.g., about 3 µm), 1-10 µm (e.g., about 1, about 2, about 3, about 4 or about 5 µm), less than 10 µm, and less than 5 µm. In particular embodiments, a laser system is configured to operate with sufficiently focused laser pulses to ablate a sample area in the order of about 1 µm, e.g., 100 nm to 1 µm.

In order to analyze individual cells the laser in the laser ablation system has a spot size which is no larger than these cells. This size will depend on the particular cells in a sample, but in general the laser spot will therefore have a diameter of less than 4 µm e.g. within the range 0.1-4 µm, 0.25-3 µm, or 0.4-2 µm. Thus, a laser spot can have a diameter of about 3 µm or less, about 2 µm or less, about 1 µm or less, about 0.5 µm or less than 0.5 µm, such as around 400 nm or less, around 300 nm or less, around 200 nm or less, around 100 nm or less than 100 nm. In order to analyze cells at a subcellular resolution the invention uses a laser spot size which is no larger than these cells, and more specifically uses a laser spot size which can ablate material with a subcellular resolution. Sometimes, single cell analysis can be performed using a spot size larger than the size of the cell, for example where cells are spread out on the slide, with space between the cells. Here, a larger spot size can be used and single cell characterization achieved, because the additional ablated area around the cell of interest does not comprise additional cells. The particular spot size used can therefore be selected appropriately dependent upon the size of the cells being analyzed. In biological samples, the cells will rarely all be of the same size, and so if subcellular resolution imaging is desired, the ablation spot size should be smaller than the smallest cell, if constant spot size is maintained throughout the ablation procedure. Small spot sizes can be achieved using demagnification of wider laser beams and near-field optics. A laser spot diameter of 1 µm corresponds to a laser focus point (i.e. the diameter of the laser beam at the focal point of the beam) of 1 µm, but the laser focus point can vary by ±20% or more due to spatial distribution of energy on the target (for instance, Gaussian beam shape) and variation in total laser energy with respect to the ablation threshold energy. For example, using a 25 μm diameter laser beam, and subjecting this to 25-fold demagnification onto the tissue samples will give a spot size with a 1 μm diameter.

Ablation on this small scale produces very small amount of plume material that in turn ensures that the size of the plume is kept small. A smaller plume is more likely to stay in the middle of the capture flow without contacting the walls of the ablation cell or of the transfer conduit. Ablation on the 1 micrometer scale also means that the distance between the ablated surface and the area where plume expansion slows down and becomes dominated by the ambient gas is very short. This distance can range from a few micrometers to a few hundred micrometers. In some versions of the invention, the capture flow is present where the plume stops expanding. Therefore, for illustration and not limitation, several of the appended figures show the distance between the ablated surface and the region with capture flow shown as about 100 micrometers.

Although ablation on the 1 micrometer (or lower) scale is advantageous for certain applications (e.g., imaging), the methods and instruments of the invention are also useful when larger ablation spots are produced, such as ablation spots in the range of about 5 to about 35 microns diameter, for example in the range 5-15 microns, 10-20 microns, 15-25 microns, 20-30 microns and 25-35 microns. In some applications in which large ablation spots are produced, only a portion of the plume material is captured.

In some embodiments, the laser is situated outside the ablation chamber, and the laser beam (laser energy) enters the ablation chamber, e.g., though an optical window. As used herein, a laser beam may be described as being emitted from a surface (e.g., a laser lens or mirror), which surface may be oriented to direct the beam to a particular location or pattern of locations. For ease of description of the invention, the directed beam may be considered to have a particular orientation; the orientation of the beam can refer to an imaginary line aligned with the beam and extending beyond the actual beam (for example when the beam strikes a non-transparent surface). As will be apparent from context, reference to the orientation or position of a laser beam sometimes refers to the orientation or position the beam of an unpowered laser system would produce if the laser was in use.

For rapid analysis of a tissue sample a high frequency of ablation is needed, for example more than 20 Hz (i.e. more than 20 ablations per second, giving more than 20 plumes per second). In some embodiments the frequency of ablation by the laser is at least 40 Hz, such as at least 50 Hz, or at least 100 Hz. In some embodiments the frequency of ablation by the laser is within the range 40-2000 Hz, within the range 40-1500 Hz, within the range 40-500 Hz, within the range 40-200 Hz, within the range 40-150 Hz, or within the range 75-150 Hz. An ablation frequency of more than 40 Hz allows imaging of typical tissue samples to be achieved in a reasonable time. The frequency with which laser pulses can be directed at a spot on the sample (assuming full ablation of the material at that spot) and still be individually resolved determines how quickly the pixels of the image can be obtained. Accordingly, if the duration of laser pulse required to ablate the material at a point means that only less than 5 pulses can be directed at a sample per second, the time taken to study a 1 mm×1 mm area with ablation at a spot size of 1 μm would be over two days. With a rate of 40 Hz, this would be around 6-7 hours, with further reductions in the analysis time for further increases in the frequency of pulses.

At these frequencies the instrumentation must be able to analyze the ablated material rapidly enough to avoid substantial signal overlap between consecutive ablations, if it is desired to resolve each ablated plume individually. It is preferred that the overlap between signals originating from consecutive plumes is <10% in intensity, more preferably <5%, and ideally <2%. The time required for analysis of a plume will depend on the washout time of the ablation chamber (see ablation chamber section below), the transit time of the plume of sample material to and through the ionization system (optimizations of the transport to the ionization system are discussed above), and the time taken to analyze the ionized material. Each laser pulse can be correlated to a pixel on the image of the sample that is subsequently built up, as discussed in more detail below.

Ablation Chamber

An ablation chamber with a short washout time (e.g. 100 ms or less) is advantageous for use with the apparatus and methods of the invention. A cell with a long washout time will either limit the speed at which an image can be generated or will lead to overlap between signals originating from consecutive sample spots (e.g. Kindness et al. (2003) *Clin Chem* 49:1916-23, which had signal duration of over 10 seconds). Therefore the washout time of a plume of sample material from the laser ablation cell is a key limiting factor for achieving high resolution without increasing total scan time. Ablation chambers with washout times of ≤100 ms are known in the art. For example, Gurevich & Hergenroder (2007) *J Anal. At. Spectrom.*, 22:1043-1050 discloses an ablation chamber with a washout time below 100 ms. An ablation chamber was disclosed in reference Wang et al. (2013) *Anal. Chem.* 85:10107-16 (see also reference WO 2014/146724) which has a washout time of 30 ms or less, thereby permitting a high ablation frequency (e.g. above 20 Hz) and thus rapid analysis. Another such ablation chamber is disclosed in reference WO 2014/127034. The ablation chamber in this document comprises a sample capture cell configured to be arranged operably proximate to the target (the sample capture cell described here is an example of a transfer conduit inlet modification which can be combined with the taper and flow sacrificing modifications of the transfer conduit as described above), the sample capture cell including: a capture cavity having an opening formed in a surface of the capture cell, wherein the capture cavity is configured to receive, through the opening, target material ejected or generated from the laser ablation site and a guide wall exposed within the capture cavity and configured to direct a flow of the carrier gas within the capture cavity from an inlet to an outlet such that at least a portion of the target material received within the capture cavity is transferrable into the outlet as a sample. The volume of the capture cavity in the ablation chamber of reference WO 2014/127034 is less than 1 cm$^3$ and can be below 0.005 cm$^3$. Sometimes the ablation chamber has a washout time of 25 ms or less, such as 20 ms or 10 ms or less. A sample cone inlet of the transfer conduit, for example an asymmetric sample cone, can also assist in reducing the washout time of the ablation chamber, and is an alternative to the capture cell discussed here.

Ionization System

Sample material can be ionized by a variety of techniques. The use of an ICP is suited for IMS and IMC analyses. ICP is a plasma source in which the energy is supplied by electric currents produced by electromagnetic induction. Typically the plasma source is based on Argon gas. For example, the ionization system may comprise an ICP torch. IMC using ICP in the ionization system is reported on in, for example, Giesen et al. (2014) *Nature Methods*. 11:417-422 and Wang et al. (2013) *Anal. Chem.* 85:10107-16.

The ionization system thus receives sample material from the laser sampling system and converts it into elemental ions for detection by the mass spectrometer. If the sample material is not atomized (e.g. the plume of sample material is still in the form of molecules, or even an aerosol of particulate material) then the ionization system acts to break down the material into elemental ions as part of the ionization process.

Mass Spectrometer

As noted above, the third component of the apparatus is a mass spectrometer. Mass analyzers for use in the invention may be selected based on the needs of the operator or specific application. Exemplary types of mass analyzers include quadrupole, time of flight (TOF), magnetic sector, high resolution, single or multicollector based mass spectrometers.

The time taken to analyze the ionized material will depend on the type of mass analyzer/mass spectrometer which is used for detection of ions. For example, instruments which use Faraday cups may be too slow for analyzing rapid signals, but not all analyses will require the rapid analysis of signals, and so the skilled person will be able to select the mass spectrometer or mass analyzer appropriately. Overall, the desired analysis speed (and thus the frequency with which ablation plumes can be interrogated) and degree of multiplexing (number of atoms to be monitored simultaneously/quasi-simultaneously) will dictate the type(s) of mass analyzer which should be used (or, conversely, the choice of mass analyzer will determine the speed and multiplexing which can be achieved).

Typically, time of flight mass spectrometers are used for the recording of fast transient events with the transit durations that are expected from a fast laser ablation setup.

TOF detectors can quasi-simultaneously register multiple masses in a single sample. Whereas TOF mass analyzers are normally unpopular for atomic analysis because of the compromises required to deal with the effects of space charge in the TOF accelerator and flight tube, the effectiveness of the technique can be improved by using it only to detect a subset of ranges. For example, in mass cytometry and imaging mass cytometry, a range may be chosen only such that ions from the labelling atoms used to mark target molecules in a biological samples are detected and so other atoms (e.g. those having an atomic mass below 80) can be removed. This results in a less dense ion beam, enriched in the masses in (for example) the 80-210 dalton region, which can be manipulated and focused more efficiently, thereby facilitating TOF detection and taking advantage of the high spectral scan rate of TOF. Thus, rapid analyses can be achieved by combining TOF detection with choosing labelling atoms that are uncommon in the sample and ideally having masses above the masses seen in an unlabeled sample e.g. by using the higher mass transition elements. Further details on mass cytometry can be found in Tanner et al. Cancer Immunol Immunother (2013) 62:955-965 and U.S. Pat. No. 7,479,630, and on imaging mass cytometry in Giesen et al. (2014) *Nature Methods*. 11:417-422.

Apparatus in use and additional variants of the invention to which the transfer conduit modifications described above can be applied The apparatus of the invention may be used for analysis or imaging of a biological sample, which may be on transparent substrate. In imaging embodiments, generally the laser may be operated with continuous train of pulses or in bursts of pulses directed to different positions of the sample, referred to as "spots of interest," or "locations or zones of ablation." The pulses may be directed to spots in a set pattern, such as a raster for two-dimensional imaging. Alternatively, a plurality of individual spots at different locations (for example, corresponding to individual cells) may be ablated. In some embodiments, the laser emits a burst of pulses producing a plume coming from the same pixel (i.e. the same location on the target). Ablation plumes produced by individual pulses within the burst are expected to fuse into one plume and travel within the instrument in such a way that they will be distinct from the plume produced from another pixel. To distinguish individual pixels, the time duration between bursts (pixel interrogation that can be just one pulse or 100 pulses) is maintained above a certain limit determined by the time spreading of the ion signal (at the detector) from an individual pixel.

In accordance with the present teachings, each separate sample plume can be distinctly analyzed by the mass analyzer. In one aspect, the device is configured so that spreading of the plume in ablation cell (ablation system) and transfer conduit is smaller than the spreading that occurs in the ionization system and the mass analyzer. In one aspect, plumes may be distinctly analyzed by transferring each ablated plume to the ionization system in a time period that is within the cumulative transit time of the plume to the ionization system and ion detection by the mass analyzer. This can be accomplished by capturing each sample plume through a gas flow and under a transfer configuration such that the ratio between the plume broadening during transfer time period (i.e., transfer of the ablation plume from the site of ablation to the plasma) and the broadening during ion transit time period (i.e., transfer of ions from the plasma to the mass analyzer) is equal to or less than one.

Generally, the sample particle size limit for which an ionization system (e.g. an ICP) can effectively vaporize and ionize for the purpose of analytical detection is in the order of about 10 μm or less. Particles produced by the laser ablation at 1 micrometer scale are below 1 micrometer and are well suited for an ICP ion source. For discrete particles analysis (such as may be carried out using CyTOF® instrumentation, Fluidigm Canada Inc.), the typical rate at which these particles can be ionized and analytically detected can be a function of the cumulative broadening or spread of transit time of the sample in the plasma while the particles are being evaporated and ionized and of the ions' transit time broadening or spread between the ICP and its detection by the mass analyzer. Generally the cumulative time broadening or spread can be of the order of about 200 μs duration. Consequently, for particles of 10 μm or less that are spatially separated, analyzing each distinct particle can be achieved by transferring each particle to the ionization system (e.g. ICP) in a time period of the order of 200 μs. In some embodiments the particles are transferred to the ionization system (e.g. ICP) in less than 200 μs, or less than 150 μs. Accordingly, in a sample introduction system where imaging of biological samples can be performed by laser ablation, a laser system can be configured to operate with sufficiently focused laser pulses to ablate a sample area in the order of about 1 μm, such as the application of a femtosecond pulsed laser for example. With this configuration, the ablated plumes formed by each laser pulse can include sample particulates with dimensions typically about 1 μm or less. Under certain conditions as described herein, these particulates can be captured and transferred to meet the transfer time period as required and, subsequently, each distinct plume can be effectively vaporized and ionized by the ionization system.

Additionally, while operating the laser with continuous series of pulses such as in the case of rasterizing across a sample surface for two dimensional imaging, the distinctiveness of each plume and the spatial separation between each subsequent plume can be maintained between the plume's zone of formation and the point of vaporization and ionization in the ionization system ion source. For example, as a plume is carried through a conduit, such as the injector tube shown in FIG. 1, the particles in the plume can spread and expand outwardly in a radial direction before it enters ionization system (e.g. the plasma of the ICP). Spreading of the particles produced in the plume can depend on its diffusion coefficient, the velocity profile of carrier flow and the distribution of particle density as it is formed and as it evolves during transit to the ionization system. For example, the femtosecond laser ablation spot size of 1 μm can produce a plume with an initial cross section diameter of about 100 μm or less before further spreading during its transit. The extent of spreading of the plume can also be a function of the dimension of the ablated particle; larger particles tend to have lower diffusion spreading but with higher momentum resulting in potential losses due to contacting the inner walls of the transfer conduit/injector tube. It is thus desirous to minimize the plume spreading and/or to transfer the plume to the ionization system within sufficient time to vaporize and ionize before the extent of spreading presents any challenging effects.

Accordingly, in various embodiments, the use of a laser for ablating 1 μm sample spots and efficiently transporting the plume so that the spreading is maintained within the internal diameter of the transfer conduit/injector tube can be achieved by the exemplary arrangements described herein and in the accompanying drawings.

For a given laser ablation system and given sample, ablated plumes expand after the laser ablation until they reach a characteristic volume, referred to as the "sampling volume." It is desirable to configure the system to minimize the sampling volume, and to increase the velocity with which the gas flow carries the plume away from the sampling volume. The combination of a small sampling volume and fast gas flow reduces the time spreading of the plume transfer into the transfer conduit/injector. The sampling volume can be described by the envelope of the plume at the moment when the velocity of plume expansion in any of the dimensions falls substantially (~10 times) below the sonic velocity of the surrounding gas media. Without limitation, exemplary sampling volumes may be in the range $10^{-6}$ mm$^3$-10 mm$^3$. Often the sampling volume is in the range 0.001 mm$^3$-1 mm$^3$. The capture flow, where present, flows into at least part of the sampling volume and carries at least a portion of the plume into the transfer conduit/injector whereupon it may be transported by the transfer flow to the ionization system (e.g. ICP). It is desirable that the velocity of capture flow when it enters the sampling volume be substantial (e.g., >1 m/s, >10 m/s, >100 m/s, or >500 m/s). In some embodiments the velocity of capture flow when it enters the sampling volume can be estimated by measuring the velocity of the capture flow into the transfer conduit/injector (e.g., though the transfer conduit/injector aperture). In some embodiments this measured velocity is >1 m/s, >10 m/s, >100 m/s, or >500 m/s. In contrast to the present invention, if the plume is not swept away rapidly, it will continue to expand and diffuse, undesirably filling the entire ablation cell.

In one aspect, the invention provides a laser ablation configuration in which the laser beam is directed to a target. In one embodiment, the target comprises a substrate and a sample disposed on the substrate. In one embodiment the substrate is transparent and the target is a transparent target.

In one aspect, the invention provides a laser ablation configuration (discussed below in the context of, but not limited to, FIG. 2), for "through-target" ablation. In this configuration, the pulse of a laser beam is directed through the transparent target and a sample plume (the "ablated plume" or the "plume") is formed downstream of the beam into a transfer conduit/injector. Also see FIGS. 3-5. Through-target illumination is advantageous for optimizing transit time broadening due to the removal of optical elements (windows, objective lenses, etc.) from the straight path of the plume. In one aspect, the invention provides a laser ablation system comprising (a) a laser capable of producing laser illumination; (b) a laser ablation cell (or laser ablation system) into which a transparent target may be introduced and an transfer conduit/injector with an opening through which an ablated plume may enter, where the laser illumination originates from a surface on one side of the transparent target and the transfer conduit/injector opening is on the other side. Other features that may be included in the system are described throughout this disclosure including the examples.

In FIG. 1, a laser ablation mass cytometer comprises a laser ablation system that can be connected to an injector, such as a tube fabricated from quartz or other generally suitable material, and mounted for sample delivery into an inductively coupled plasma (ICP) source, also referred to as an ICP torch. The plasma of the ICP torch can vaporize and ionize the sample to form ions that can be received by a mass analyzer.

Figure 2:
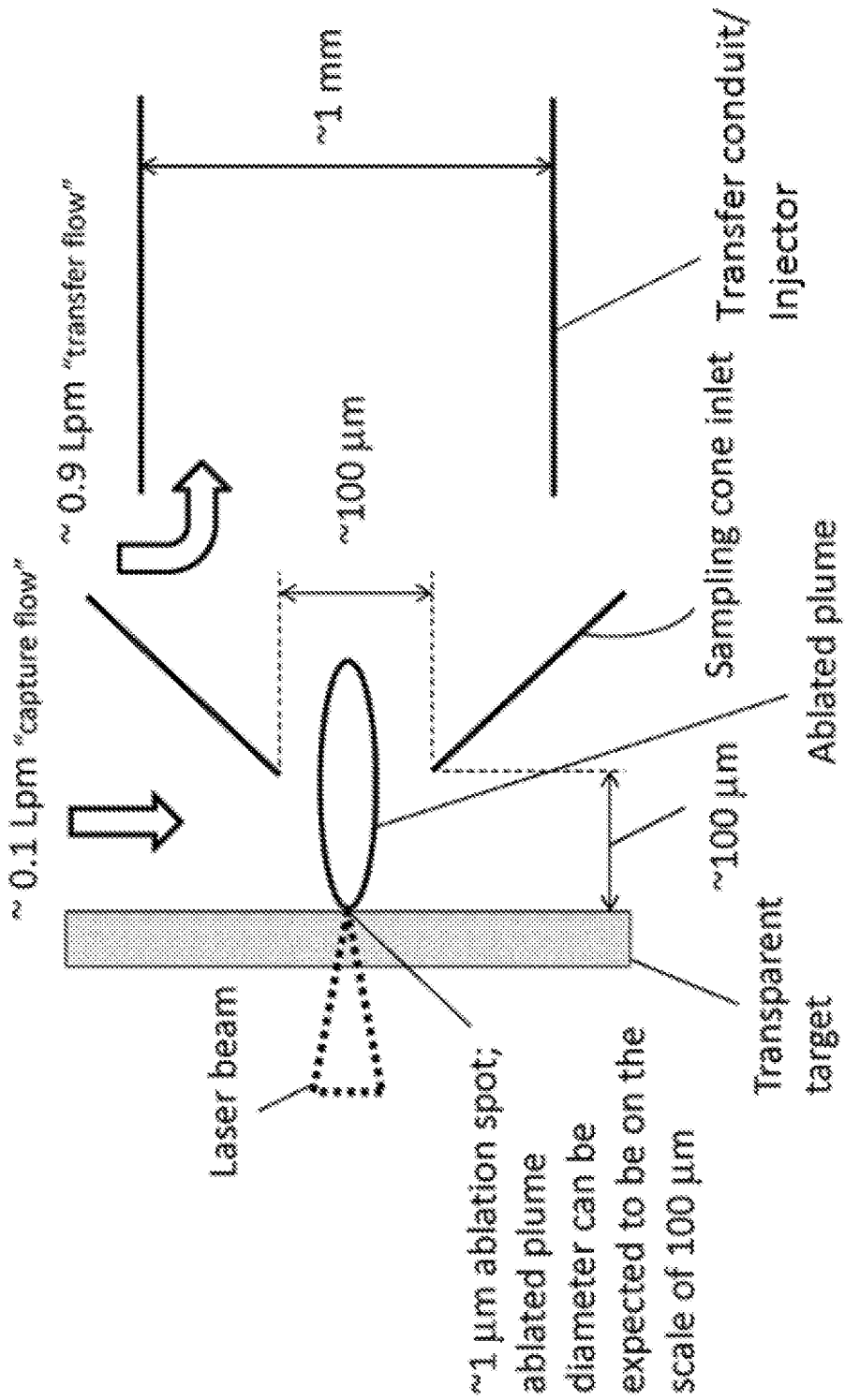
FIG. 2 is a diagrammatic view of an embodiment of the laser ablation system of FIG. 1 showing the sampling of the laser ablated plume through an aperture configured for transferring the plume into an injector.

In various embodiments according to FIG. 2, the sample of interest can be configured for laser ablation by using a sample formatted to be compatible with a transparent target. A sample can be placed onto a transparent substrate, incorporated into a transparent substrate or can be formed as the transparent target. Suitable laser-transparent substrates may comprise glass, plastic, quartz and other materials. Generally the substrate is substantially planar or flat. In some embodiments the substrate is curved. Substrates are from 0.1 mm up to 3 mm thick, in certain embodiments. In some embodiments, the substrate is encoded (see, e.g., Antonov, A. and Bandura, D., 2012, U.S. Pat. Pub. 2012/0061561, incorporated by reference herein). In this configuration, the pulse of a laser beam is directed through the transparent target and a sample plume (the "ablated plume" or the "plume") is formed downstream of the beam into a transfer conduit/injector.

The transfer conduit can have an inlet configured to capture the ablated plume; such as the inlet formed as a sample cone having a small opening or aperture as illustrated in FIG. 2. In this configuration, the sample cone can be positioned near the area, or zone, where the plume is formed. For example, the opening of the sample cone may be positioned from 10 μm to 1000 μm from the transparent target, such as about 100 μm away from the transparent target. Consequently, the ablated plume can be generated and formed at least partially within the expanding region of the cone. In some embodiments, the diameter of the aperture and/or dimensions of the spacing (including angles) are adjustable to permit optimization under various conditions. For example, with a plume having a cross sectional diameter in the scale of 100 μm, the diameter of the aperture can be sized in the order of 100 μm with sufficient clearance to prevent perturbation to the plume as it passes.

The transfer conduit can continue downstream of the sampling cone for receiving the ablated plume in such a configuration as to encourage the movement of the plume and preserve the spatial distinctiveness of each subsequent plume as a function of the laser pulses. Accordingly, a flow of gas can be introduced to aid in directing the plume through the aperture of the sampling cone in order to capture (capture flow) each plume distinctively while an additional flow of gas can be introduced to the transfer conduit/injector for transferring (transfer flow or sheath flow) each distinctly captured plume towards the ionization system. Another function of the transfer or sheath flow is to prevent the particles produced in the plume from contacting the walls of the transfer conduit/injector. The gas(es) may be, for example, and without limitation, argon, xenon, helium, nitrogen, or mixtures of these. In some embodiments the gas is argon. The capture flow gas and the transfer flow gas may be the same or different.

It is within the ability of one of ordinary skill in this field guided by this disclosure to select or determine gas flow rates suitable for the present invention. The total flow through the transfer conduit is typically dictated by the requirements of the ionization source (e.g. an ICP ionization source). The laser ablation setup needs to provide the flow that would match these requirements. For example, in FIG. 2, as well as other figures illustrating various configurations, the transfer conduit has been generally described with a 1 mm inner diameter in conjunction with the cumulative gas flow rate of about 1 liter per minute (0.1 liter per minute capture flow plus 0.9 liter per minute transfer flow). It would be expected that smaller or larger diameter transfer conduits, along with the correspondingly selected gas flow rates, can be applied to the various geometries presented with similar expected results. Conditions for maintaining non-turbulent gas dynamic within the transfer conduit in order for preserving the distinctiveness of each separate ablated plume are desirable.

As described herein, given a particular configuration of elements (e.g., a particular configuration of gas inlet positions, apertures, transfer conduit properties, and other elements), the capture and transfer flow rates are selected to result in transfer of each ablated plume to the ionization system (e.g. ICP) in a time period that is within the cumulative transit time of the plume between the ionization system and its detection by the mass analyzer. This can be accomplished by capturing each sample plume through a gas flow and under a transfer configuration such that the ratio between the plume broadening during transfer time period and the broadening during ion transit time period is equal to or less than one. That is, the time broadening (or time spreading) of the transit signal that is important. ICP-MS devices (such as the CyTOF® ICP-TOF instrument, Fluidigm Canada Inc.) are characterized by an inherent broadening of the signal. In the case of laser ablation, the act of injecting a single plume may or may not be fast in comparison to the time spreading on the ICP-MS itself. The spreading of the plume before ionization depends on the design of the laser ablation system, and in particular the ablation chamber and the transfer conduit. It is desirable that the laser ablation system and the transfer conduit do not spread the original ablation plume more than the inherent broadening of the remaining instrument. This condition ensures that the spike in detection signal produced by ablation plume is as sharp (in time) as it could be for the chosen instrument. If the spreading of the plume is much longer then the spreading in an, for example, ICP-MS system, an event of laser ablation from a single pulse will come out much broader at the detector. But, if the spreading in the laser ablation section is smaller than the instrument spreading the total spreading will be dominated by the instrument spreading. Thus, one can measure the instrument spreading using calibration beads and then measure the total spreading from a single laser pulse and compare these two numbers. If the spreading from the laser ablation is smaller than the spreading from the instrument, the total spreading will be less than 2-times of the instrument spreading.

The characteristic instrument time broadening can be measured experimentally, for example using labeled cells or calibration beads. Any time a single bead enters a mass cytometer (e.g., CyTOF® ICP-TOF instrument) the bead goes through evaporation and ionization in plasma and then goes through the mass analyzer until its signal reaches detector. The transient event is detected and used to record information about the particular bead, such as the width of the transient signal (which represents the time spread from a single event) and the value of spreading that occurs starting from the ICP source and ending at the detector.

In some embodiments, the device is configured to allow time spreading of between 10 and 1000 microseconds for the path defined between the sample and the ion detector of the mass analyzer.

Typical capture flow rates are in the range of 0.1 to 1 Lpm. An optimal capture flow rate can be determined experimentally, but is usually at the lower end of the range (e.g., about 0.1 Lpm). Typical transfer flow rates are in the range of 0.1 to 1 Lpm. An optimal transfer flow rate can be determined experimentally, but is usually at the higher end of the range (e.g., about 0.9 Lpm). In some embodiments, the capture flow rate is lower than the transfer flow rate. The transfer flow rate can be 0 in some cases, for example if the capture flow rate is approximately 1 Lpm. Often the transfer flow rate is in the range of 0.4-1 Lpm (e.g., 0.4, 0.6, 0.8 or 1 Lpm).

For illustration, in the configuration shown in FIG. 2, the flow rate of the gas supplied for capturing the plume through the sampling cone can be about 0.1 liters per minute while the transfer flow of about 0.9 liters per minute can pass through a 1 mm inner diameter transfer conduit/injector tube. The gas flows and their introduction orientation can be optimized for effective capture and transfer of each ablated plume so that each plume maintains its distinctiveness.

Figure 3A:
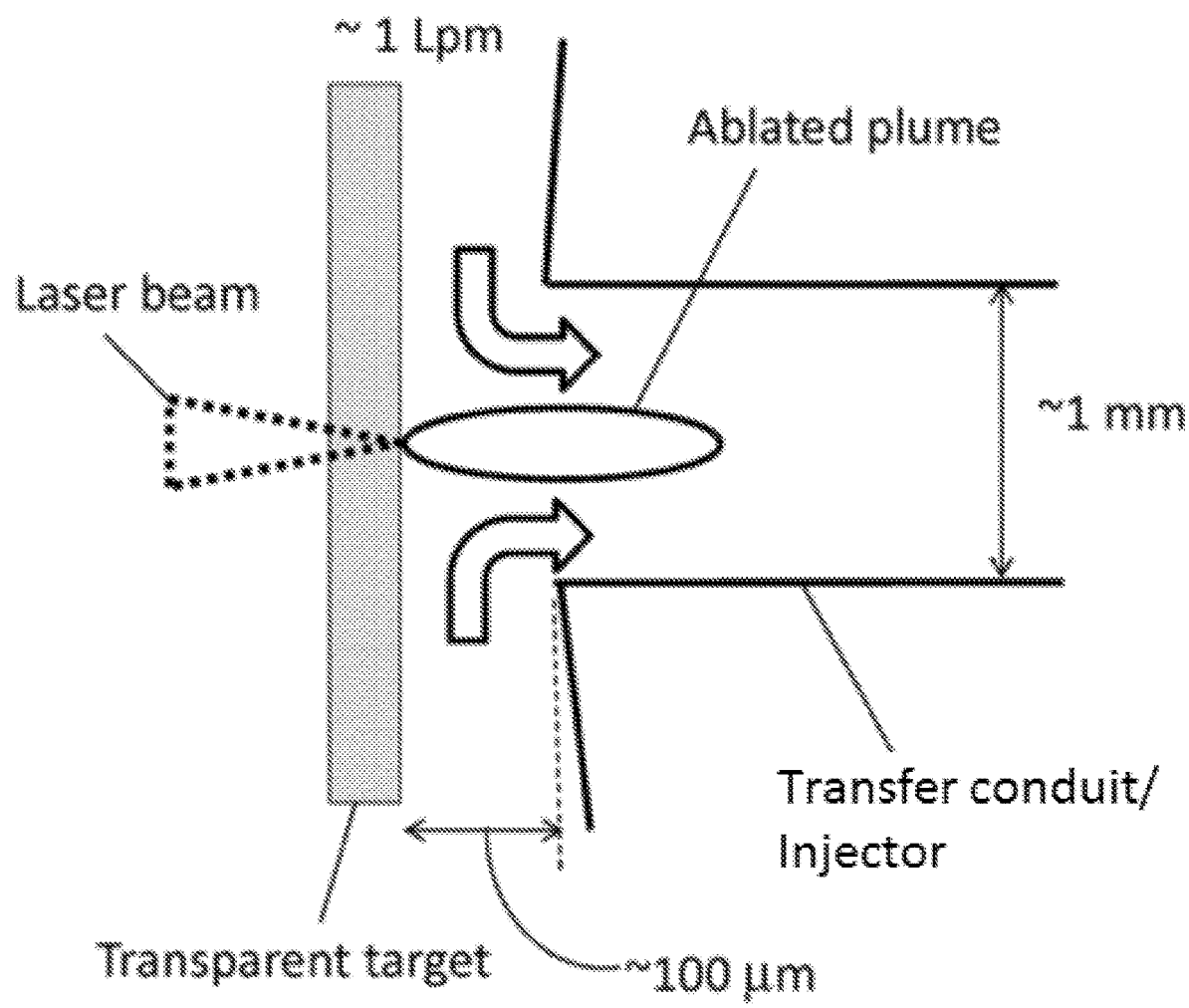
FIG. 3A is a view of an alternative configuration similar to FIG. 2 with the plume sampled directly into the injector.
Figure 3B:
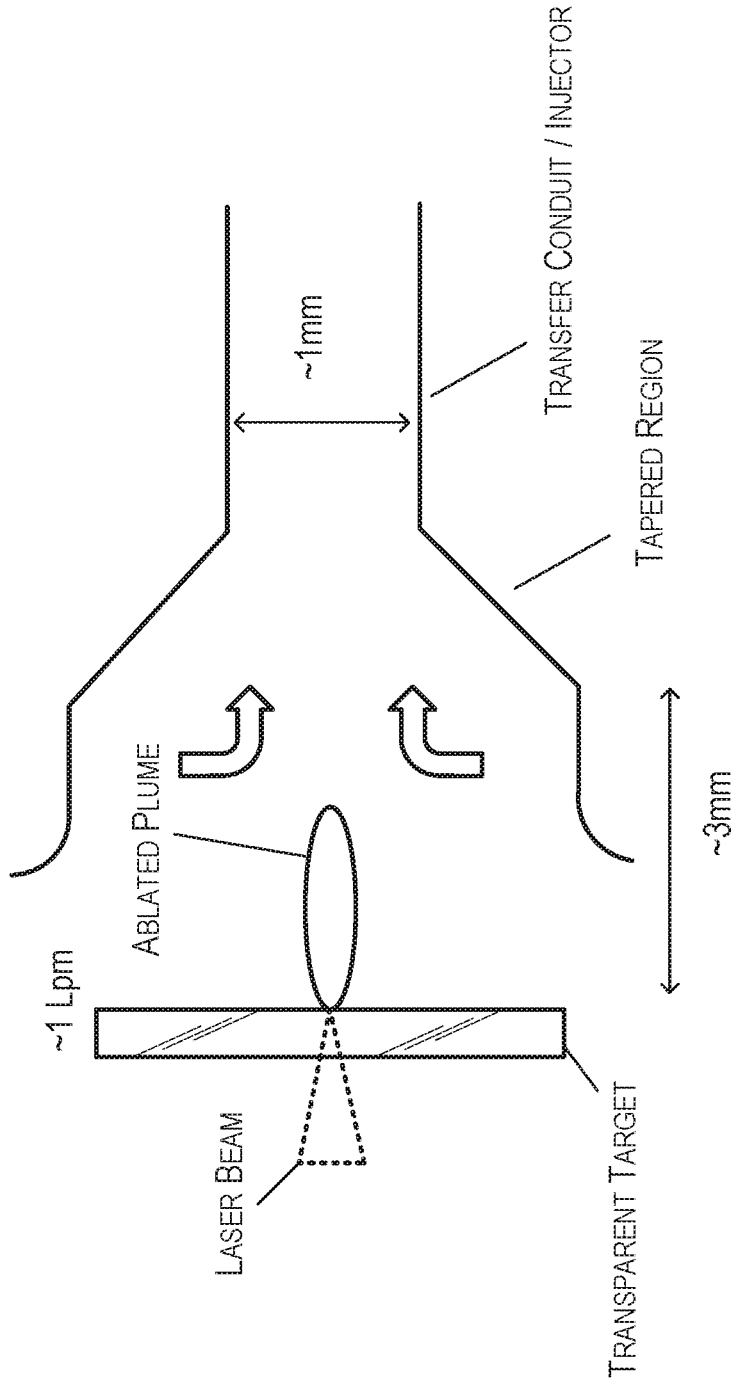
FIG. 3B is a view of the tapered conduit embodiment of this configuration.

In various embodiments according to FIG. 3, the sampling cone of FIG. 2 can be omitted so that an open ended transfer conduit/injector can be positioned in place of the aperture. In this configuration the accumulative flow rate of about 1 liter per minute of the supply gas can be introduced in such a way as to be able to capture and to transfer each ablated plume distinctly and directly into the transfer conduit/injector. In some embodiments the distance between the surface of the transparent target and the transfer conduit/injector inlet is 500 μm or less, such as less than about 200 μm, less than about 100 μm or less than about 50 μm. In the configuration of FIG. 3, there is no separate capture flow and transfer flow. Instead, a single gas flow directs the plume through the aperture and transfers the distinctly captured plume towards the ionization system (e.g. ICP). In this arrangement, the gas flow is often in the range of 0.2 liters per minute to 2 liters per minute.

Figure 4:
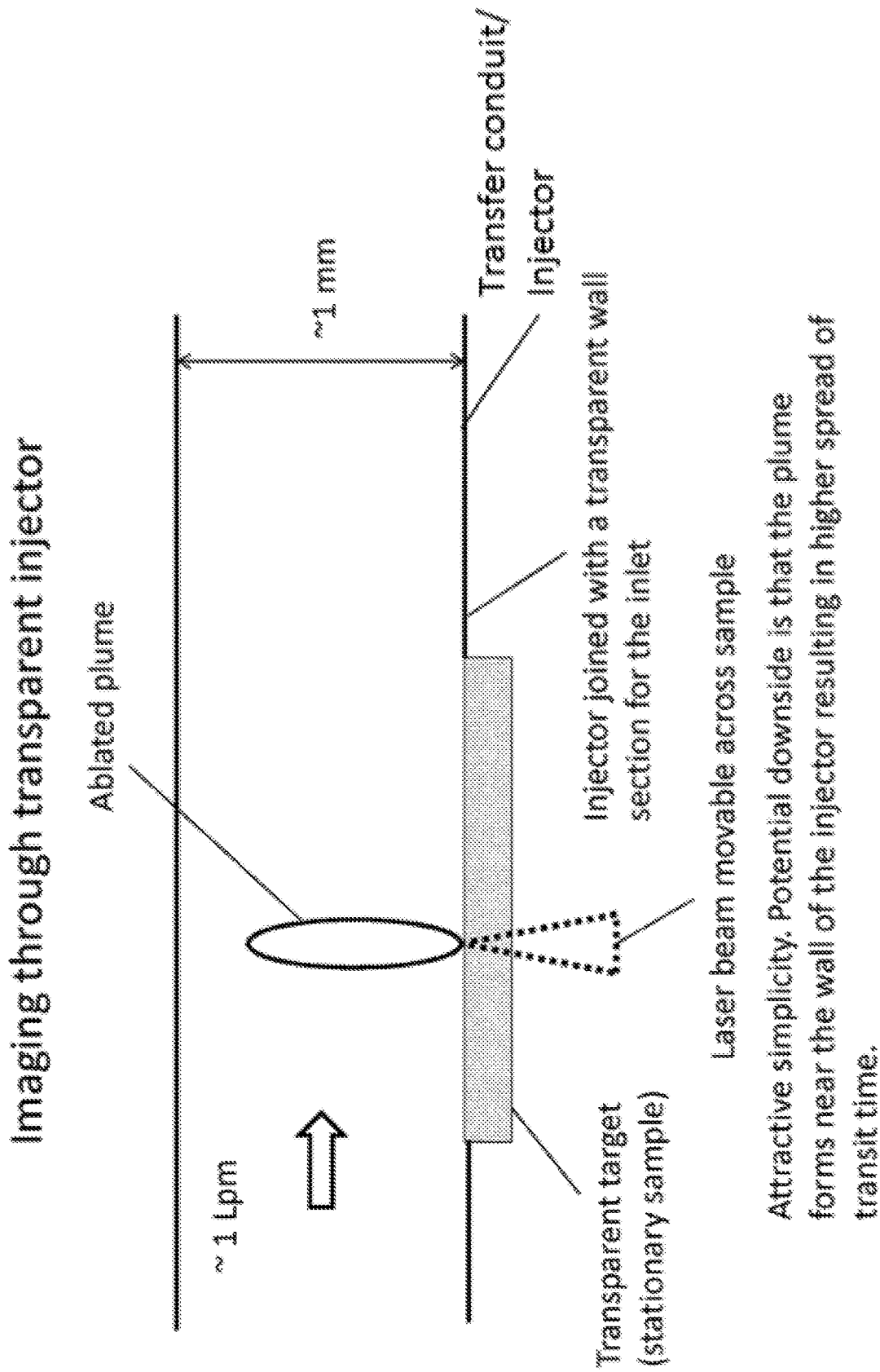
FIG. 4 and FIG. 5 are diagrammatic views of further various embodiments of the laser ablation system of FIG. 1 showing the generation and the sampling of the laser ablated plume within the injector.
Figure 5:
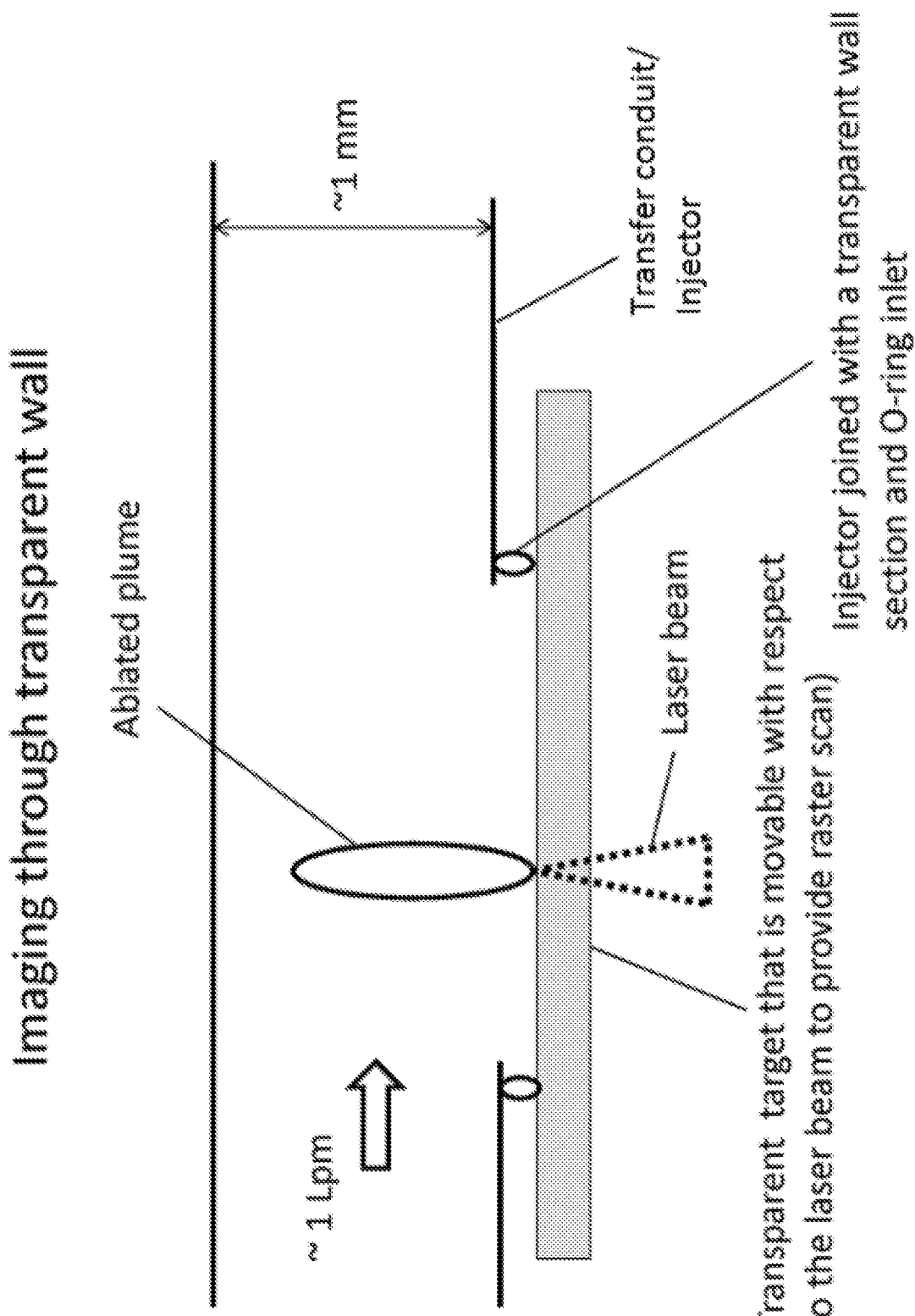

In various embodiments, the ablated plume can be formed directly within the transfer conduit/injector tube with its direction of formation oriented in the transverse direction as indicated in FIG. 4 and FIG. 5. With the similar transparent target configuration as described according to FIG. 2, each ablated plume can be captured by the gas flow (about 1 liter per minute) and drawn downstream to the ionization system (e.g. ICP). Since the transparent target illustrated in FIG. 4 is in a fixed position with respect to the transfer conduit/injector tube, the location of each ablation spot can be varied to provide scanning capabilities. For example, the incident laser beam ablation can be moved to various spots of interest across the stationary sample or moved in a raster pattern to provide greater imaging capability. Generally in raster operation, the pulsed laser operates continuously as the location of ablation changes according to a set pattern. Alternatively, in various embodiments, the laser beam can remain stationary while the target can be configured for movement to provide different spots for the ablation as illustrated in FIG. 5.

Figure 6:
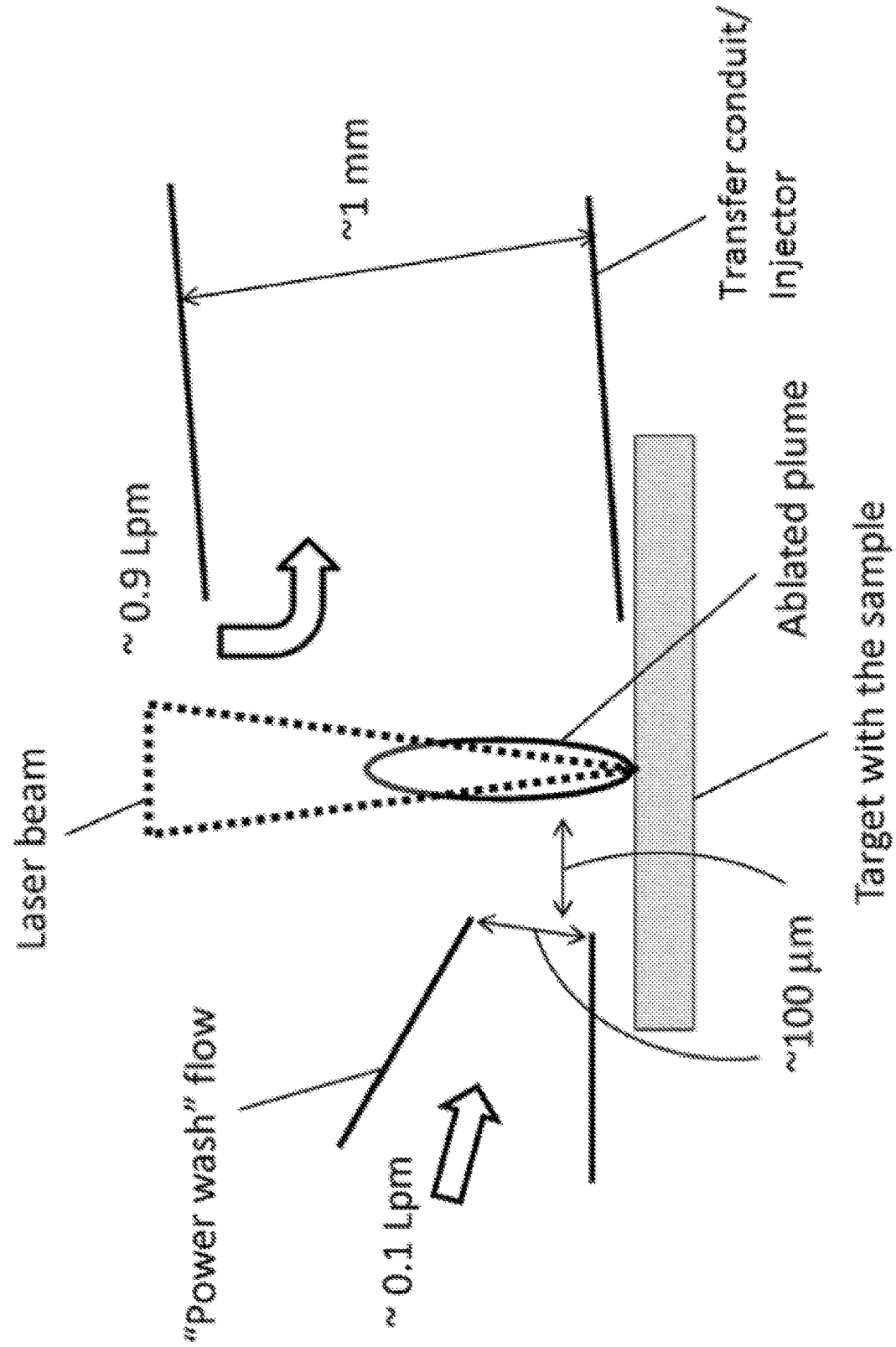
FIG. 6 is a view of an alternative configuration similar to FIG. 2 but showing a 'power wash' flow directed normal to the plume formation to direct the plume for transfer into the injector.

In various embodiments according to FIG. 6, the laser beam can be directed incident onto the target from the same side as the sample. In this instance, the sample can be placed on a substrate and each pulse of the laser beam can generate the ablated plume expanding in the direction of the incident laser. The laser radiation might be about orthogonal to the substrate or may be oriented at other angles, which will result in ablation spot that is stretched (for instance, elliptical instead of round). A constrain to the laser radiation angle is that the radiation itself converges in a cone. Focusing of the beam to 1 micrometer scale requires the cone angle to be quite wide (often expressed as operating at high numerical aperture). This means that significant tilting of the laser beam might affect the ability to focus the laser to a tight spot.

FIG. 6 illustrates the use of a "power wash." A 'power wash' flow of gas can be directed near (e.g., at about 100 μm distance away) the zone from which the plume is formed. The gas flow from the 'power wash' can force the ablated plume, or redirect the plume, towards the inlet end of the transfer conduit/injector tube, effectively capturing each plume as it is formed or generated. With the similar configuration as described according to the above examples, the injector tube can be provided with a gas flow (about 0.9 liters per minute in this illustration) to capture and transfer the plume towards the ionization system (e.g. ICP). In various embodiments for example, the 'power wash' flow can be achieved with a flow of gas (about 0.1 liter per minute) delivered through a narrow nozzle (about 100 μm in diameter for example) for creating a gas jet suitable for redirecting each subsequent ablated plume into the transfer conduit/injector tube. The source of the power wash gas flow (e.g., nozzle) can be referred to as a "gas inlet," because it is an inlet of the power wash gas flow toward the plume. Alternatively the source of the power wash gas flow can be referred to as a "port." For example, the 'power wash' flow of gas can emerge from a nozzle at a distance of 50 μm to 200 μm from the laser ablation spot (the zone of formation of the plume). It will be clear that, as used in this context, "nozzle" does not refer to any particular structure, but refers to the outlet from which the power wash gas emerges. As illustrated in FIG. 6, the diameter of the power wash nozzle is smaller than the inner diameter (or equivalent cross-sectional dimension) of the transfer conduit/injector. For example, the diameter of the nozzle may be from 10% to 50% of the diameter of the transfer conduit/injector. In some embodiments the power wash directs the plume into a cone-shaped transfer conduit/injector inlet.

FIG. 7 shows an embodiment where the sample under study is illuminated by the laser radiation from the top side. The laser radiation is focused by an objective then passes through an optical window and finally enters sealed ablation chamber through a conical conduit. The conical shape of the conduit allows for the laser radiation to pass to the target while providing a conduit for the capture gas to exit the chamber. The capture gas carries the content of ablation plume and then merges with the sheath flow. By choosing dimensions of the gas channels and flow rates one can ensure that the capture flow gets surrounded by the sheath flow and that the plug from an ablation plume stays near the axis of the transfer conduit/injector flow. This location of the plume facilitates the fastest transfer of the plume with reduced time spreading.

FIG. 8 shows a configuration similar to that of FIG. 7 and illustrates that a stronger sheath flow may be used to surround flow with plume material in the center of the flow. FIG. 8 illustrates that a part of the sheath flow is discarded as a sacrificial flow while the core of the sheath flow containing capture flow and plume material enters a short conduit that supplies this flow into the ICP.

The technique of utilizing sacrificial flow illustrated in FIG. 8 can be applied to other configurations described above. In such embodiments the transfer conduit/injector can be considered to have two portions with different inner diameters. A major benefit of sacrificial flow configuration is that the capture flow and the plume material stay near the center of the tubing where velocity profile of the gas flow is nearly flat, i.e. different parts of the captured plume advance with similar velocities.

Figure 9:
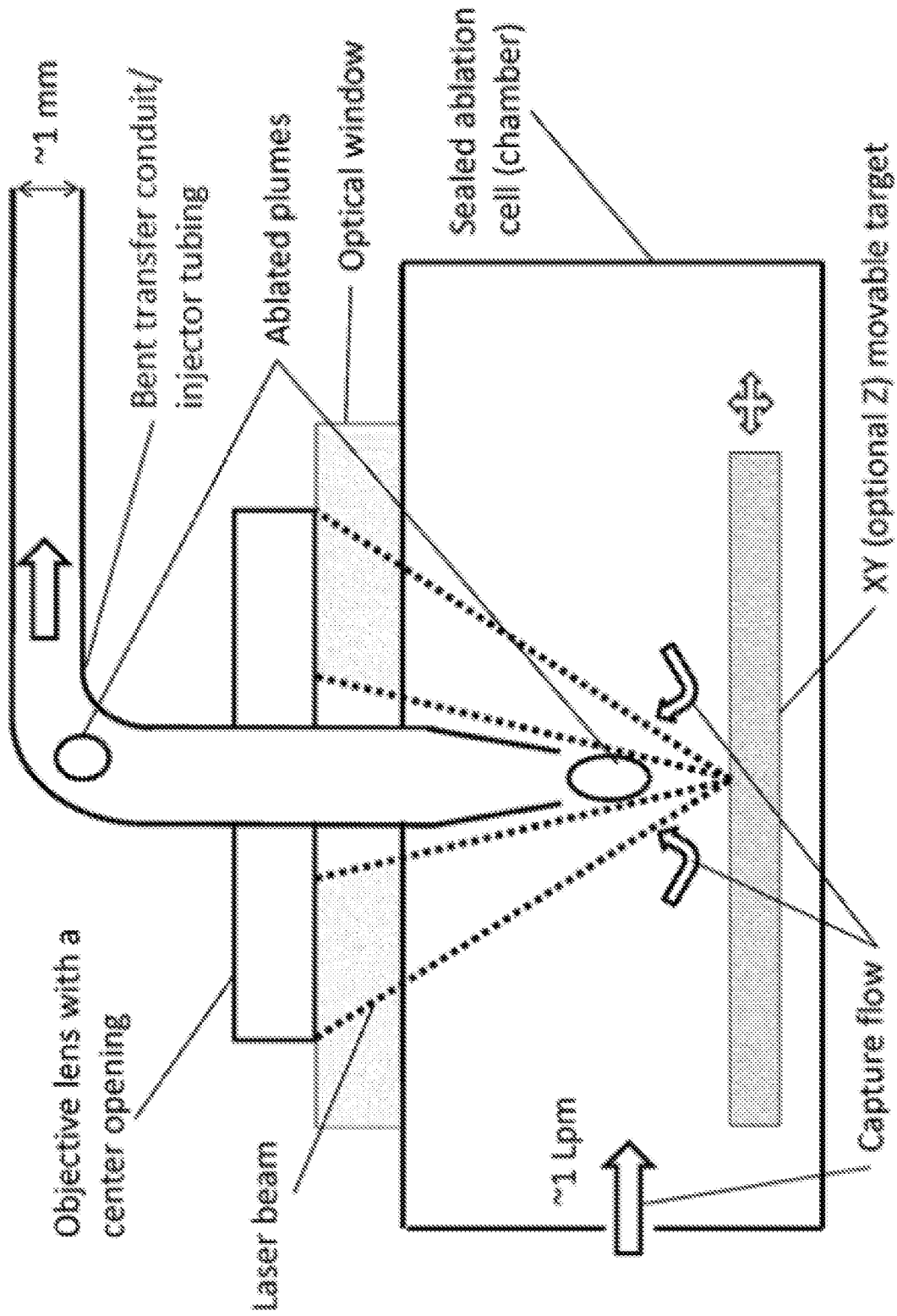
FIG. 9 shows an arrangement in which the plume is sampled into an injector that passes through the objective lens.

FIG. 9 shows another embodiment with laser beam illumination on top of the sample. Here the plume is sampled into the sampling conduit arranged about normal to the target. The plume material is surrounded by the capture flow that also acts as a sheath flow.

The gas dynamics of the capture of the plume in FIG. 9 resembles that of FIG. 3 where through-target illumination is used. Since the laser radiation in FIG. 9 is also positioned normal to the target (as is the gas conduit) the objective lens and the optical window have an opening for the gas conduit. After passing through the objective lens the conduit is bent to take the sample away from the optical path and move it into the ionization system.

Figure 10:
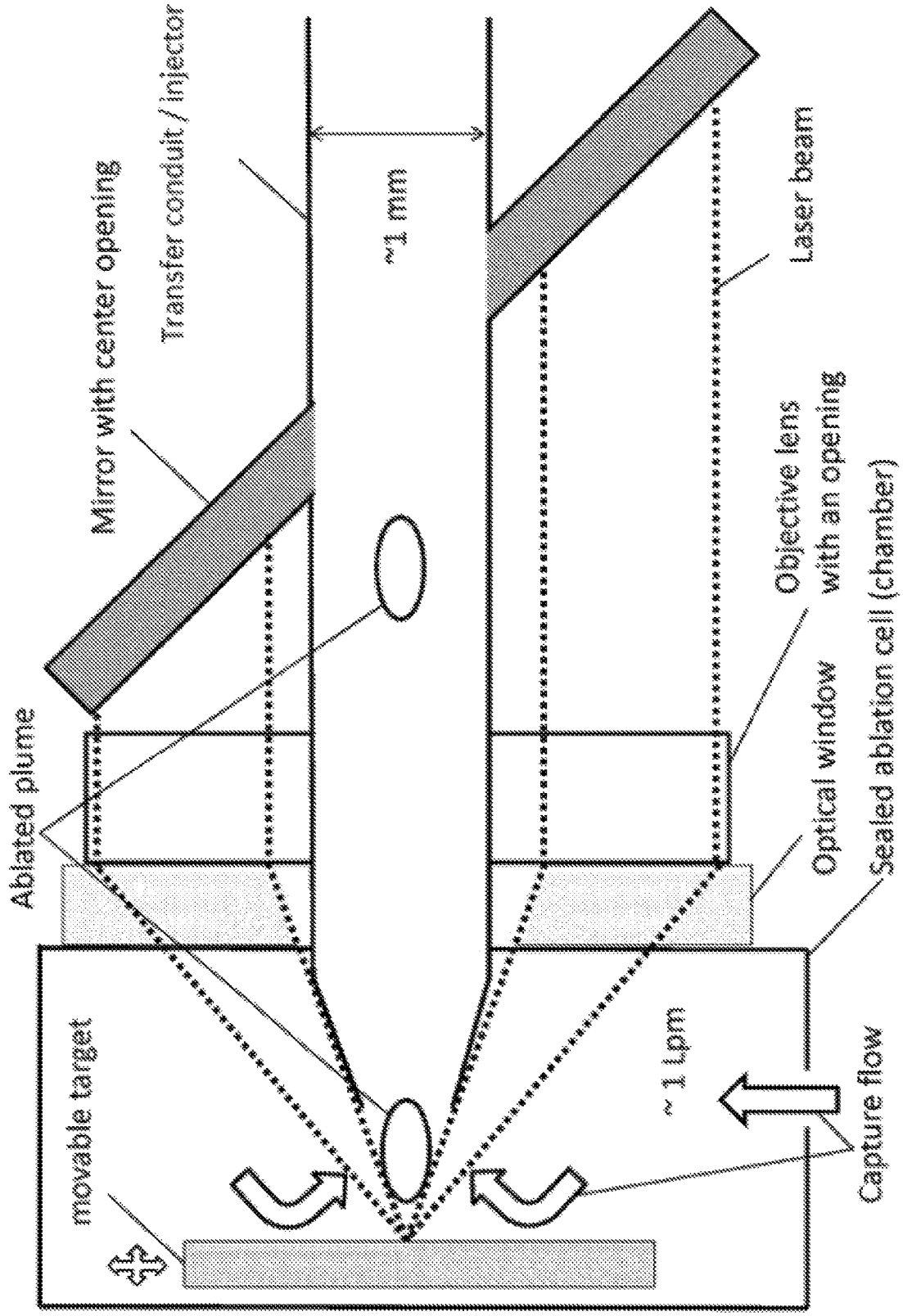
FIG. 10 shows an arrangement in which the plume is sampled into an injector that passes through the objective lens and a mirror.

FIG. 10 shows an arrangement in which laser ablation and plume sampling is similar to the embodiment shown in FIG. 9. However, to avoid bending the gas conduit further downstream the laser radiation is bent instead using a mirror. Here the optical window, the objective length and the mirror all have openings for the passing of gas conduit carrying capture gas and plume material.

While the present teachings are described in conjunction with various embodiments, it is not intended that the present teachings be limited to such embodiments. On the contrary, the present teachings encompass various alternatives, modifications, and equivalents, as will be appreciated by those of skill in the art. For example, in the various examples illustrated in the figures, the transfer conduit/injector tube has been generally described with a 1 mm inner diameter in conjunction with the cumulative gas flow rate of about 1 liter per minute (0.1 plus 0.9 liter per minute). It would be expected that smaller or larger diameter transfer conduit/injectors, along with the correspondingly selected gas flow rates, can be applied to the various geometries presented with similar expected results. However, conditions for maintaining non-turbulent or nearly non-turbulent gas dynamic within the injector tube in order for preserving the distinctiveness of each separate ablated plume may be desirable.

Furthermore, in some instances of elevated laser pulse rates, more than one ablated plume can be distinctly captured and transferred to the ionization system (e.g. ICP) within the cumulative transit time spread as discussed above. For example, at a repetition rate of 10 kHz a pulsed laser can generate two ablated plumes in 200 μs that can be subsequently transferred to the ICP for ionization. The ions generated from the two discrete plumes can be analyzed as a single discrete packet of ions by the mass analyzer. Consequently, while the laser remains at the same ablation spot or while the laser's rate of movement over a trace of continuous spots is less than the repetition rate, the ablated plumes, and the subsequent ions, can provide an accumulative mass analysis at the same ablation spot or provide an average mass distribution along the trace respectively. It should be noted that laser repetition rate as high as several MHz can be employed resulting in a signal that represents averaging of many laser pulses. The laser can also be fired in bursts to provide a gap in the data flow between individual sampling locations (or pixels).

It will be understood that the methods and devices of the invention may be used with any of a variety of types of samples, e.g., biological samples. In one approach the sample is cellular material, such as a tissue section, cell monolayer, cell preparation, or the like. A sample may be a thinly sectioned biological tissue up to 100 micrometers thickness, a tissue sample in the order of millimeters thickness, or an un-sectioned tissue sample. In one example, thin tissue sections (such as paraffin embedded sections) may be used. For illustration, some tissue sections have a thickness of 10 nanometers to ~10 micrometers. In some cases, the sample is a group of cells, or one or more selected cells from a group of cells. See, e.g., Antonov, A. and Bandura, D., 2012, U.S. Pat. Pub. 2012/0061561, incorporated by reference herein.

Constructing an image IMS and IMC can provide signals for multiple labelling atoms/elemental tags in plumes. Detection of a label in a plume reveals the presence of its cognate target at the position of ablation (or, correspondingly, the position of desorption of the slug of material). By generating a series of plumes at known spatial locations on the sample's surface the MS signals reveal the location of the labels on the sample, and so the signals can be used to construct an image of the sample. By labelling multiple targets with distinguishable labels it is possible to associate the location of labelling atoms with the location of cognate targets, so the invention can build complex images, reaching levels of multiplexing which far exceed those achievable using existing techniques. For instance, the GRAPHIS package from Kylebank Software may be used, but other packages such as TERAPLOT, ImageJ and CellProfiler can also be used. Imaging using MS data from techniques such as MALDI-MSI is known in the art e.g. Robichaud et al. (2013) *J Am Soc Mass Spectrom* 24(5):718-21 discloses the 'MSiReader' interface to view and analyze MS imaging files on a Matlab platform, and there are also instruments for rapid data exploration and visualization of both 2D and 3D MSI data sets in full spatial and spectral resolution e.g. the 'Datacube Explorer' program.

Samples

The invention provides a method of imaging a sample. All kinds of samples can be analysed by the methods, including alloys, geological samples and archaeological samples. Biological samples can also be analyzed. Such samples comprise a plurality of cells, a plurality of these cells can be subjected to IMS and/or IMC in order to provide an image of these cells in the sample. In general, the invention can be used to analyze tissue samples which are now studied by IHC techniques, but with the use of labels which are suitable for detection by IMC.

Any suitable tissue sample can be analyzed. For example, the tissue can be epithelium tissue, muscle tissue, nerve tissue, etc., and combinations thereof. For diagnostic or prognostic purposes the tissue can be from a tumor. In some embodiments a sample may be from a known tissue, but it might be unknown whether the sample contains tumor cells. Imaging can reveal the presence of targets which indicate the presence of a tumor, thus facilitating diagnosis. The tissue sample may comprise breast cancer tissue, for example human breast cancer tissue or human mammary epithelial cells (HMLE). The tissue sample may comprise formalin-fixed, paraffin-embedded (FFPE) tissue, may be a frozen tissue, or may be a tissue embedded in a suitable resin. The tissues can be obtained from any living multicellular organism, but will usually be human.

The tissue sample will usually be a section e.g. having a thickness within the range of 2-10 µm, such as between 4-6 µm. Samples of less than 2 µm thickness can also be analyzed, such as less than 1 µm, less than 500 nm, less than 250 nm or even 100 nm or less. A thinner tissue sample would produce lower signal due to the reduction of the volume of sample ablated by a later pulse, but the thinner the section, the more sections can be generated from a tissue sample, which provides benefits in terms of 3-D imaging by imaging multiple sections. Techniques for preparing such sections are well known from the field of IHC e.g. using microtomes, including dehydration steps, including embedding, etc. Thus a tissue may be chemically fixed and then sections can be prepared in the desired plane. Cryosectioning or laser capture microdissection can also be used for preparing tissue samples. Samples may be permeabilized e.g. to permit of reagents for labelling of intracellular targets (see above).

The size of a tissue sample to be analyzed will be similar to current IHC methods, although the maximum size will be dictated by the laser ablation apparatus, and in particular by the size of sample which can fit into its ablation chamber. A size of up to 5 mm×5 mm is typical, but smaller samples (e.g. 1 mm×1 mm) are also useful (these dimensions refer to the size of the section, not its thickness).

Labelling of the Tissue Sample

In some embodiments, as described above, the apparatus and methods of the invention detect atoms that have been added to a sample (i.e. which are not normally present). Such atoms are called labelling atoms (the labelling atoms therefore represent an elemental tag). The sample is typically a biological sample comprising cells, and the labelling atoms are used to label target molecules in the cells/on the cell surface. In some embodiments, simultaneous detection of many more than one labelling atom, permitting multiplex label detection e.g. at least 3, 4, 5, 10, 20, 30, 32, 40, 50 or even 100 different labelling atoms is enabled. By labelling different targets with different labelling atoms it is possible to determine the presence of multiple targets on a single cell.

Labelling atoms that can be used with the invention include any species that are detectable by MS and that are substantially absent from the unlabelled sample. Thus, for instance, $^{12}C$ atoms would be unsuitable as labelling atoms because they are naturally abundant, whereas $^{11}C$ could in theory be used because it is an artificial isotope which does not occur naturally. In preferred embodiments, however, the labelling atoms are transition metals, such as the rare earth metals (the 15 lanthanides, plus scandium and yttrium). These 17 elements provide many different isotopes which can be easily distinguished by MS. A wide variety of these elements are available in the form of enriched isotopes e.g. samarium has 6 stable isotopes, and neodymium has 7 stable isotopes, all of which are available in enriched form. The 15 lanthanide elements provide at least 37 isotopes that have non-redundantly unique masses. Examples of elements that are suitable for use as labelling atoms include Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu), Scandium (Sc), and Yttrium (Y). In addition to rare earth metals, other metal atoms are suitable for detection by MS e.g. gold (Au), platinum (Pt), iridium (Ir), rhodium (Rh), bismuth (Bi), etc. The use of radioactive isotopes is not preferred as they are less convenient to handle and are unstable e.g. Pm is not a preferred labelling atom among the lanthanides.

In order to facilitate TOF analysis (see above) it is helpful to use labelling atoms with an atomic mass within the range 80-250 e.g. within the range 80-210, or within the range 100-200. This range includes all of the lanthanides, but excludes Sc and Y. The range of 100-200 permits a theoretical 101-plex analysis by using different labelling atoms, while permitting the invention to take advantage of the high spectral scan rate of TOF MS. As mentioned above, by choosing labelling atoms whose masses lie in a window above those seen in an unlabelled sample (e.g. within the range of 100-200), TOF detection can be used to provide rapid analyses at biologically significant levels.

Labelling the sample generally requires that the labelling atoms are attached to one member of a specific binding pair (sbp). This labelled sbp is contacted with a sample such that it can interact with the other member of the sbp (the target sbp member) if it is present, thereby localizing the labelling atom to a target molecule in the sample. The method of the invention then detects the presence of the labelling atom on a particle as it is analyzed by the mass cytometer. Rare earth metals and other labelling atoms can be conjugated to sbp members by known techniques e.g. Bruckner et al. (2013) *Anal. Chem.* 86:585-91 describes the attachment of lanthanide atoms to oligonucleotide probes for MS detection, Gao & Yu (2007) *Biosensor Bioelectronics* 22:933-40 describes the use of ruthenium to label oligonucleotides, and Fluidigm Canada sells the MaxPar™ metal labelling kits which can be used to conjugate over 30 different labelling atoms to proteins (including antibodies).

Various numbers of labelling atoms can be attached to a single sbp member, and greater sensitivity can be achieved when more labelling atoms are attached to any sbp member. For example greater than 10, 20, 30, 40, 50, 60, 70, 80, 90 or 100 labelling atoms can be attached to a sbp member. For example, monodisperse polymers containing multiple monomer units may be used to form an elemental tag, each containing a chelator such as DTPA. DTPA, for example, binds 3+ lanthanide ions with a dissociation constant of about $10^{-6}$M [Tanner et al. Cancer Immunol Immunother (2013) 62:955-965]. These polymers can terminate in a thiol-reactive group (e.g. maleimide) which can be used for attaching to a sbp member. For example, the thiol-reactive group may bind to the Fc region of an antibody. Other functional groups can also be used for conjugation of these polymers e.g. amine-reactive groups such as N-hydroxy succinimide esters, or groups reactive against carboxyls or against an antibody's glycosylation. Any number of polymers may bind to each sbp member. Specific examples of polymers that may be used include straight-chain ("X8") polymers or third-generation dendritic ("DN3") polymers, both available as MaxPar™ reagents. Use of metal nanoparticles can also be used to increase the number of atoms in a label.

As mentioned above, labelling atoms are attached to a sbp member, and this labelled sbp member is contacted with the sample where it can find the target sbp member (if present), thereby forming a labelled sbp. The labelled sbp member can comprise any chemical structure that is suitable for attaching to a labelling atom and then for detection according to the invention.

In general terms, methods of the invention can be based on any sbp which is already known for use in determining the presence of target molecules in samples (e.g. as used in IHC or fluorescence in situ hybridisation, FISH) or fluorescence-based flow cytometry, but the sbp member which is contacted with the sample will carry a labelling atom which is detectable by MS. Thus, the invention can readily be implemented by using available flow cytometry reagents, merely by modifying the labels which have previously been used e.g. to modify a FISH probe to carry a label which can be detected by MS.

The sbp may comprise any of the following: a nucleic acid duplex; an antibody/antigen complex; a receptor/ligand pair; or an aptamer/target pair. Thus a labelling atom can be attached to a nucleic acid probe which is then contacted with a sample so that the probe can hybridize to complementary nucleic acid(s) therein e.g. to form a DNA/DNA duplex, a DNA/RNA duplex, or a RNA/RNA duplex. Similarly, a labelling atom can be attached to an antibody which is then contacted with a sample so that it can bind to its antigen. A labelling atom can be attached to a ligand which is then contacted with a sample so that it can bind to its receptor. A labelling atom can be attached to an aptamer ligand which is then contacted with a sample so that it can bind to its target. Thus labelled sbp members can be used to detect a variety of target molecules in a sample, including DNA sequences, RNA sequences, proteins, sugars, lipids, or metabolites.

In a typical embodiment the labelled sbp member is an antibody. Labelling of the antibody can be achieved through conjugation of one or more labelling atom binding molecules to the antibody, for example using the MaxPar™ conjugation kit as described above. The target molecule of an antibody is called its antigen, and may be a protein, carbohydrate, nucleic acid etc. Antibodies which recognize cellular proteins that are useful for mass cytometry are already widely available for IHC usage, and by using labelling atoms instead of current labelling techniques (e.g. fluorescence) these known antibodies can be readily adapted for use in methods of the invention, but with the benefit of increasing multiplexing capability. Antibodies used with the invention can recognize targets on the cell surface or targets within a cell. Antibodies can recognize a variety of targets e.g. they can specifically recognize individual proteins, or can recognize multiple related proteins which share common epitopes, or can recognize specific post-translational modifications on proteins (e.g. to distinguish between tyrosine and phospho-tyrosine on a protein of interest, to distinguish between lysine and acetyl-lysine, to detect ubiquitination, etc.). After binding to its target, labelling atom(s) conjugated to an antibody can be detected to reveal the presence of that target in a sample.

The labelled sbp member will usually interact directly with a target sbp member in the sample. In some embodiments, however, it is possible for the labelled sbp member to interact with a target sbp member indirectly e.g. a primary antibody may bind to the target sbp member, and a labelled secondary antibody can then bind to the primary antibody, in the manner of a sandwich assay. Usually, however, the invention relies on direct interactions, as this can be achieved more easily and permits higher multiplexing. In both cases, however, a sample is contacted with a sbp member which can bind to a target sbp member in the sample, and at a later stage label attached to the target sbp member is detected.

One feature of the invention is its ability to detect multiple (e.g. 10 or more, and even up to 100 or more) different target sbp members in a sample e.g. to detect multiple different proteins and/or multiple different nucleic acid sequences in samples. To permit differential detection of these target sbp members their respective sbp members should carry different labelling atoms such that their signals can be distinguished by MS. For instance, where ten different proteins are being detected, ten different antibodies (each specific for a different target protein) can be used, each of which carries a unique label, such that signals from the different antibodies can be distinguished. In some embodiments, it is desirable to use multiple different antibodies against a single target e.g. which recognize different epitopes on the same protein.

If more than one labelled antibody is used, it is preferable that the antibodies should have similar affinities for their respective antigens, as this helps to ensure that the relationship between the quantity of labelling atoms detected by MS and the abundance of the target antigen will be more consistent across different sbps (particularly at high scanning frequencies).

If a target sbp member is located intracellularly, it will typically be necessary to permeabilize cell membranes before or during contacting of the sample with the labels. For example when the target is a DNA sequence but the labelled sbp member cannot penetrate the membranes of live cells, the cells of the sample can be fixed and permeabilized. The labelled sbp member can then enter the cell and form a sbp with the target sbp member.

Usually, a method of the invention will detect at least one intracellular target and at least one cell surface target. In some embodiments, however, the invention can be used to detect a plurality of cell surface targets while ignoring intracellular targets. Overall, the choice of targets will be determined by the information which is desired from the method.

Labelling of the sample is not wholly reliant on sbp. In some instances classical dyes can be used to highlight desired features on the tissue. In a number of cases the dyes used for microscopy contain elements that are rare in the natural cell state. Thus, in the process of dyeing the tissue it gets enriched with particular elements that are readable by apparatus and methods described herein.

Accordingly, in some embodiments, the methods of analysis described above comprise the step of labelling a sample with at least one labelling atom. This atom can then be detected using the methods described above.

General

The term "comprising" encompasses "including" as well as "consisting" e.g. a composition "comprising" X may consist exclusively of X or may include something additional e.g. X+Y.

The term "about" in relation to a numerical value x is optional and means, for example, x±10%.

The word "substantially" does not exclude "completely" e.g. a composition which is "substantially free" from Y may be completely free from Y. Where necessary, the word "substantially" may be omitted from the definition of the invention.

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. All publications and patent documents cited herein are incorporated herein by reference as if each such publication or document was specifically and individually indicated to be incorporated herein by reference. Citation of publications and patent documents (patents, published patent applications, and unpublished patent applications) is not intended as an admission that any such document is pertinent prior art, nor does it constitute any admission as to the contents or date of the same.

The invention claimed is:

1. An apparatus comprising:
   (i) a laser ablation system, adapted to generate plumes of sample material from a sample;
   (ii) an ionization system, adapted to receive material removed from the sample by the laser ablation system and to ionize said material to form elemental ions;
   (iii) a mass spectrometer to receive elemental ions from said ionization system and to analyze said elemental ions,
   wherein the laser ablation system and the ionization system are coupled together by a transfer conduit, adapted to carry a flow of gas containing the plumes of ablated sample material from the laser ablation system to the ionization system,
   and
   wherein the apparatus configured to provide high-speed transfer with non-turbulent transfer flow.

2. The apparatus of claim 1, wherein the ionization system comprises an ICP torch including an inlet for an injector makeup flow of gas introduced into an injector of the ICP torch.

3. The apparatus of claim 2, wherein the injector makeup flow is argon gas.

4. The apparatus of claim 1, wherein the apparatus is configured to provide helium gas flow to transport plumes of ablated sample material from the laser ablation system to the ionization system in a flow of helium gas.

5. The apparatus of claim 4, wherein the apparatus is configured to provide helium gas flow to transport plumes of sample material from the laser ablation system to the ionization system in a flow of only helium gas.

6. The apparatus of claim 1, wherein there is no separate capture flow and transfer flow.

7. The apparatus of claim 1, wherein the non-turbulent transfer flow is characterized by a Reynolds number of 2000 or less.

8. The apparatus of claim 7, configured to provide a high speed transfer in a transfer conduit of at least 300 meters per second.

9. The apparatus of claim 1, wherein the non-turbulent transfer flow is between 0.2 liters per minute to 2 liters per minute.

10. The apparatus of claim 1, wherein the transfer conduit comprises an internal diameter section at or narrower than 1 mm.

11. The apparatus of claim 10, wherein the internal diameter section is at or narrower than 800 μm.

12. The apparatus of claim 1, wherein the internal surface of the transfer conduit comprises a taper along at least a portion of its length.

13. The apparatus of claim 12, wherein the taper begins within 50 mm of the ionization system inlet.

14. The apparatus of claim 1, wherein the transfer conduit is straight along the entire distance from the laser ablation system to the ionization system.

15. A method of laser ablation mass cytometry analysis, the method comprising:
  i) directing pulses of a laser beam to a sample to generating a plume of sample for each of the pulses;
  ii) capturing each plume distinctively for each of the pulses;
  iii) transferring each of the distinctively captured plume to an ionization system, wherein the transfer is a high-speed transfer with non-turbulent transfer flow; and
  iv) ionizing each of the distinctively captured and transferred plumes in the ionization system and generating ions for mass analysis.

16. The method of claim 15, wherein step iii) of transferring comprises transporting material of the sample from a laser ablation system to the ionization system in a flow of helium gas.

17. The method of claim 15, wherein the non-turbulent transfer flow is characterized by a Reynolds number of 2000 or less.

18. The method of claim 15, wherein the non-turbulent transfer flow is between 0.2 liters per minute to 2 liters per minute.

19. The method of claim 15, wherein the non-turbulent transfer flow is provided at a high-speed transfer in a transfer conduit of at least 300 meters per second.

20. The method of claim 19, wherein the non-turbulent transfer flow is provided in a transfer conduit comprising an internal diameter section narrower than 1 mm.

21. The method of claim 19, wherein the non-turbulent transfer flow is provided in a tranfer conduit, and the internal surface of the transfer conduit comprises a taper along at least a portion of its length.

22. The method of claim 15, wherein steps i) through iv) are performed with an apparatus comprising:
  a laser ablation system, adapted to generate plumes of sample material from the sample;
  the ionization system, adapted to receive material removed from the sample by the laser ablation system and to ionize said material to form elemental ions;
  a mass spectrometer to receive elemental ions from said ionization system and to analyze said elemental ions,
  wherein the laser ablation system and the ionization system are coupled together by a transfer conduit, adapted to carry a flow of gas containing the plumes of ablated sample material from the laser ablation system to the ionization system.

* * * * *

UNITED STATES PATENT AND TRADEMARK OFFICE
CERTIFICATE OF CORRECTION

PATENT NO. : 10,622,199 B2
APPLICATION NO. : 16/322418
DATED : April 14, 2020
INVENTOR(S) : Alexander V. Loboda Page 1 of 1

It is certified that error appears in the above-identified patent and that said Letters Patent is hereby corrected as shown below:

In the Claims

Column 34, Line 10 (approximately):
In Claim 21, delete "tranfer" and insert -- transfer --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*